(12) United States Patent
Singh et al.

(10) Patent No.: US 6,590,424 B2
(45) Date of Patent: Jul. 8, 2003

(54) HIGH-THROUGHPUT ASYNCHRONOUS DYNAMIC PIPELINES

(75) Inventors: Montek Singh, New York, NY (US); Steven M. Nowick, Leonia, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 09/904,278

(22) Filed: Jul. 12, 2001

(65) Prior Publication Data

US 2002/0069347 A1 Jun. 6, 2002

Related U.S. Application Data

(60) Provisional application No. 60/218,546, filed on Jul. 12, 2000, and provisional application No. 60/240,655, filed on Oct. 6, 2000.

(51) Int. Cl.$^7$ ................. H03K 19/00; H03K 19/0175
(52) U.S. Cl. ................ 326/93; 326/21; 326/82
(58) Field of Search .............. 326/93, 95, 98, 326/37, 82, 21

(56) References Cited

U.S. PATENT DOCUMENTS 5,392,423 A * 2/1995 Yetter .................. 395/550
5,513,132 A * 4/1996 Williams ............... 364/715.01

OTHER PUBLICATIONS

J. Cortadella, M. Kishinevsky, A Kondratyev, L. Lavgno, A. Yakolev, "Lazy Transition Systems: Application to Timing Optimization of Asynchronous Circuits," In *ICCAD*, 1998, pp. 1–8.
A.E. Dooply and K.Y. Yun. "Optimal Clocking and Enhanced Testability for High–Performance Self–Resetting Domino Pipelines", In *ARVLSI '99*, pp. 1–15.
C. Farnsworth, D. Edwards, and S. Sikand, "Utilizing Dynamic Logic for Low Power Consumption in Asynchronous Circuits." In *Proc. Intl. Symp. Adv. Res. Async. Circ. Syst. (ASYNC)*, 1994, pp. 1–9.
S.B. Furber, J. Liu, "Dynamic logic in four–phase micropipelines," *Proc. of ASYNC'96*. IEEE Computer Society Press, Mar. 1996, pp. 1–6.
A. J. Martin, A. Lines, R. Manohar, M. Nystroem, P. Penzes, R. Southworth, and U. Cummings, "The Design of an Asynchronous MIPS R3000 Microprocesssor," In *Proc. ARVLSI*, Sep. 1997, pp. 1–18.
Charles E. Molnar, I.W. Jones, W.S. Coates, J.K. Lexau, S.M. Fairbanks, I.E. Sutherland, "Two FiFO Ring Performance Experiments" *Proceedings of the IEEE*, 87(2), pp. 297–308, Feb. 1999.

(List continued on next page.)

Primary Examiner—Daniel Chang
(74) Attorney, Agent, or Firm—Baker Botts LLP

(57) ABSTRACT

A latchless dynamic asynchronous digital pipeline uses control information for a processing stage from the subsequent processing stage as well as stages further down the pipeline. A first function block in a first processing stage is enabled to enter a first evaluate phase and a first precharge phase in response to a first precharge control signal provided by a second, subsequent processing stage which is asserted upon completion of evaluation by the second processing stage and a second precharge control provided by a third processing stage which is asserted upon completion of evaluation by the third processing stage, such that the first evaluate phase is enabled by at least one of the de-assertion of the first precharge control signal and the assertion of the second precharge control signal, and such that the first precharge phase is enabled by the assertion of the first precharge control signal and the de-assertion of the second precharge control signal. A completion generator on a second processing stage may be provided which is responsive to the second precharge control signal and to the data from the first processing stage, is configured to provide an indication to the first processing stage of the phase for which the second function block has been enabled in parallel with such enablement.

11 Claims, 15 Drawing Sheets

OTHER PUBLICATIONS

K.S. Stevens, S. Rotem, and R. Ginosaur,"Relative Timing", In *Proc. Intl. Symp. Adv. Res. Async. Circ. Syst.* (*ASYNC*), Apr. 1999, pp. 1–11.

K.Y. Yun, P.A. Beerel, and J. Arcco, "High–Performance Asynchronous Pipeline Circuits", In *Proc. Intl. Symp Adv. Res. Async. Circ.* (*ASYNC*), 1996, pp. 1–12.

P. Day and J.V. Woods, Investigation into Micropipeline Latch Design Styles, *IEEE YVLSI*, 3(2):264–272, Jun. 1995.

D. Harris and M.A. Horowitz, Skew–tolerant Domino Circuits. *IEEE JSSC*, 32(11): 1702–1711, Nov. 1997.

R. Kol. R. Ginosar, "A doubly–latched asynchronous pipeline," *Proc. of ICCD '96*, pp. 706–711, Oct. 1996.

G. Matsubara and N. Ide. "A Low Power Zero–Overhead Self–Timed Division and Square Root Unit Combining A Single–Rail Static Circuit with a Dual–Rail Dynamic Circuit."In *AYSNC97*, pp. 198–209, 1997.

V. Narayanan, B.A. Chapell, and B.M. Fleischer. "Static Timing Analysis for Self–Resetting Circuits," In *Proc. ICCAD*, 1996.

A.M.G. Peeters, "Single–Rail Handshake Circuits," Ph.D. Thesis, Eindhoven Technical University, 1996, pp. 1–187.

M. Renaudin, B. Hassan, and A. Guyot, "New Asynchronous Pipeline Scheme: Application to the Design of a Self–Timed Ring Divider."*IEEE JSSC*, 31(7):1001–1013, Jul. 1996.

T.E. Williams, "*Self–Timed Rings and their Application to Division.*" PhD Thesis, Stanford University, Jun. 1991, pp. 1–144.

D.C. Wong, G. DeMicheli, and M. Flynn,"Designing High Performance Digital Circuits Using Wave Pipelining." *IEEE TCAD*, 12(1):24–26, Jan. 1993.

WO 01/82053, PCT application Ser. No. PCT/US01/13777 to Chelcea et al., filed Apr. 26, 2001 (Based on provisional application Ser. No. 60/199,851, filed Apr. 26, 2000 and provisional application No. 60/210,642, file Jun. 8, 2000), entitled "A Low–Latency Fifo for Mixed–Clock Systems".

US 2002/0167337, U.S. patent appllication Ser. No. 09/877, 442, to Chelcea et al. filed Jun. 8, 2001, (based on provisional application Ser. No. 60/210,644, file Jun. 8, 2000), entitled "Low–Latency Asynchronous Fifo's Using Token RIngs".

WO 02/35346, PCT application Ser. No. PCT/US01/29721 to Singh et al., filed Sep. 21, 2001 (based on U.S. application Ser. No. 60/242,587, filed Oct. 23, 2000), entitled "Minimal Overhead Ultra–High–Speed Transition–Signaling Asynchronous Pipeline".

WO 01/95089, PCT application Ser. No. PCT/US01/18667 to Chelcea et al., filed Jun. 8, 2001 (based on provisional application Ser. No. 60/210,642, filed Jun. 8, 2000), entitled "Robust Interfaces for Mixed–Timing System With Application To Latency–Insensitive Protocols".

* cited by examiner

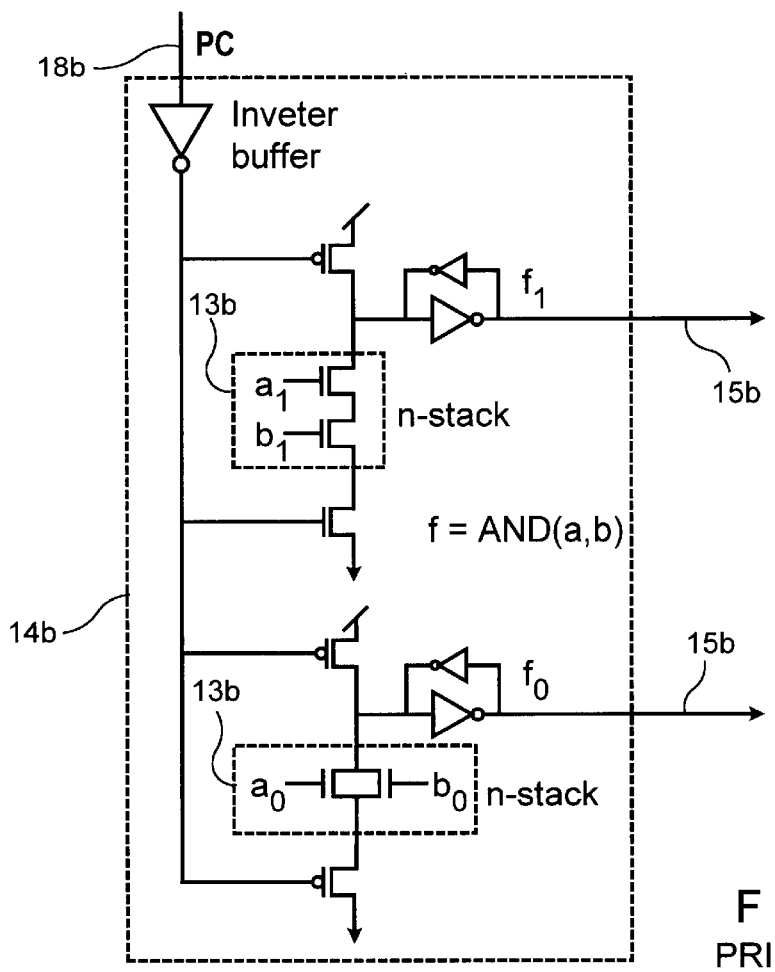
FIG. 2
PRIOR ART
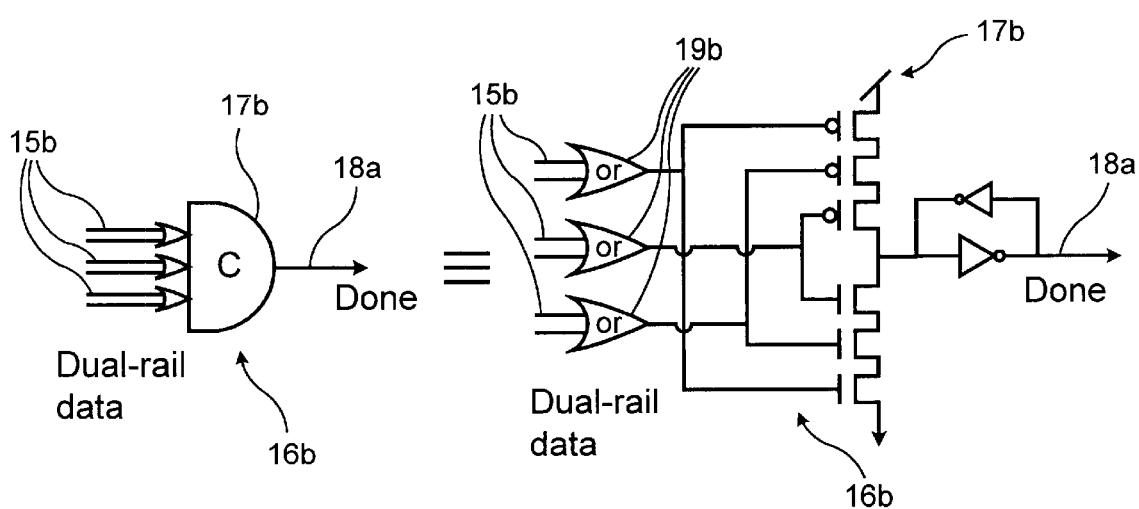
FIG. 3A
PRIOR ART
FIG. 3B
PRIOR ART

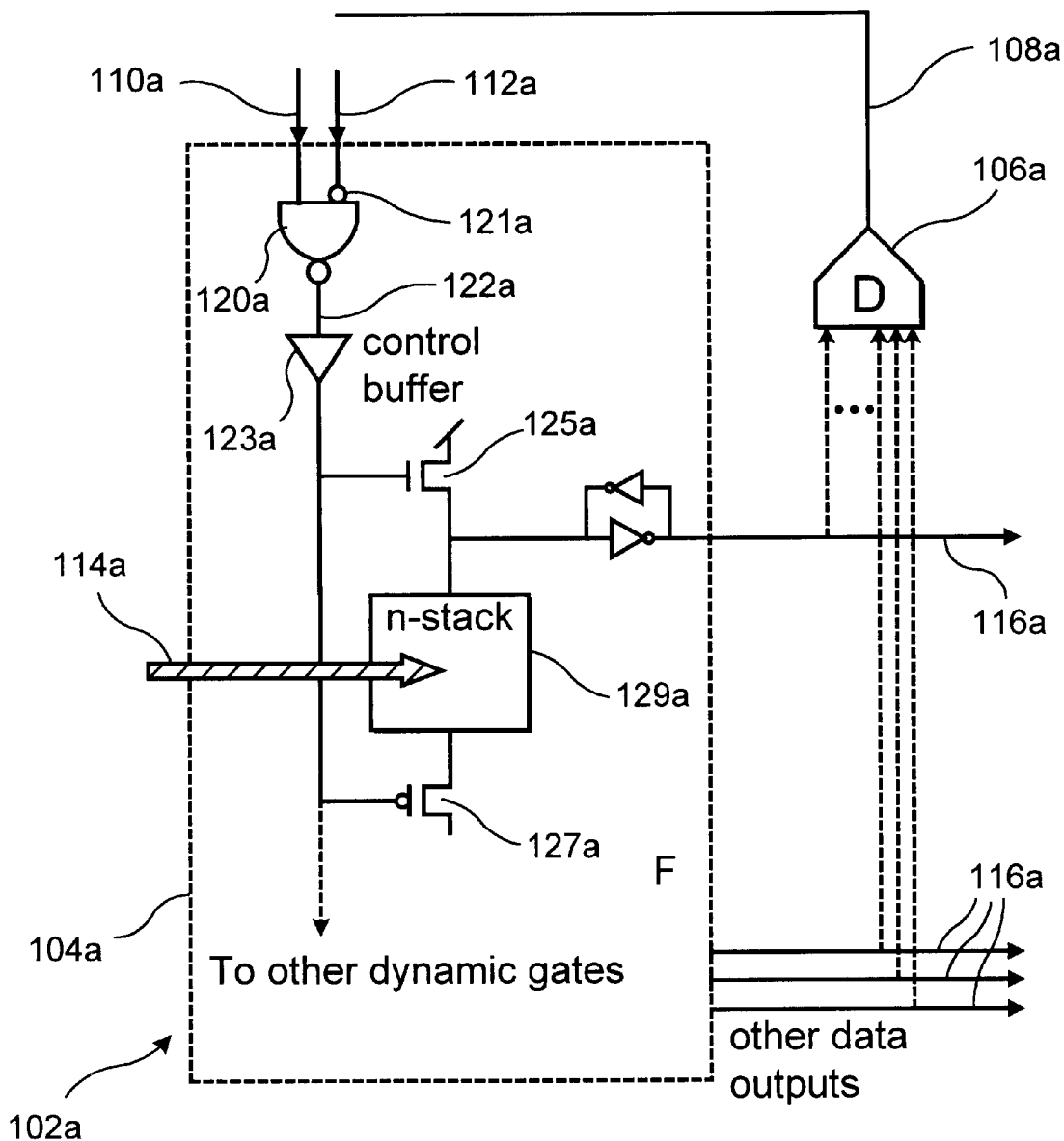
F I G. 6

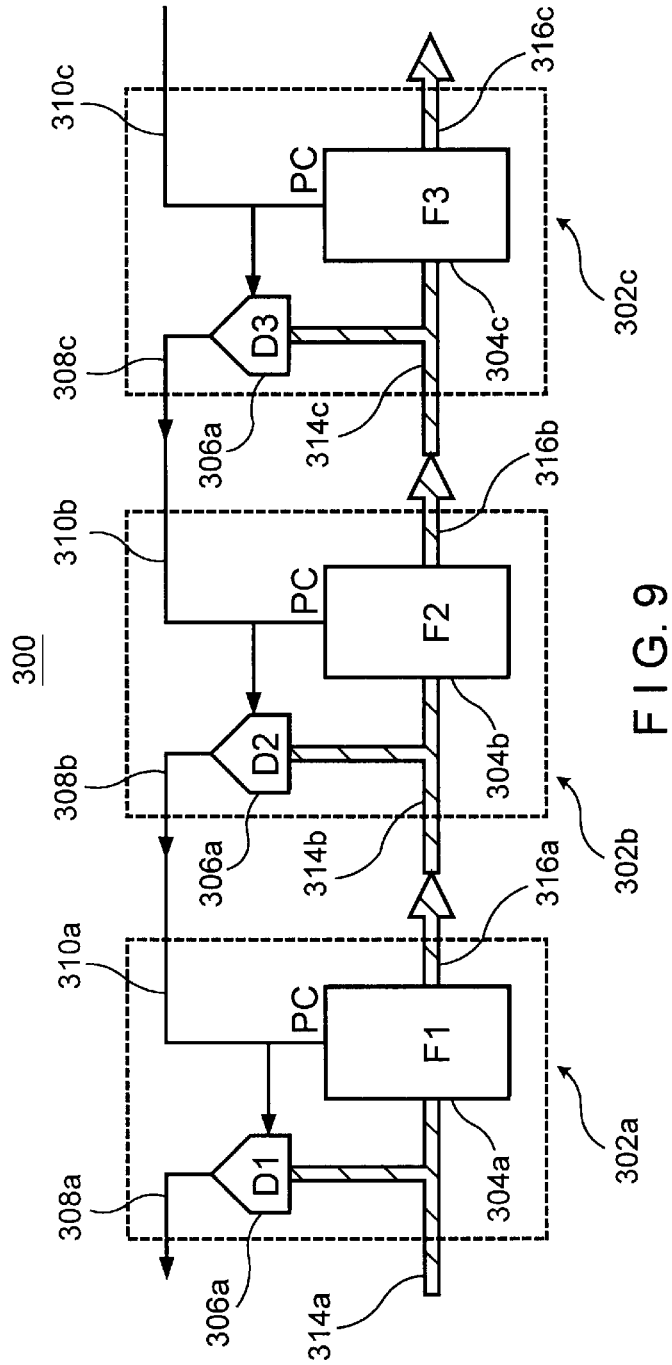
F I G. 9
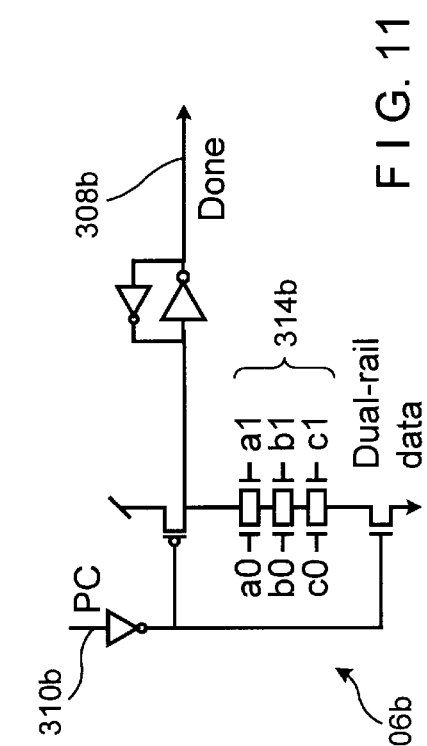
F I G. 11
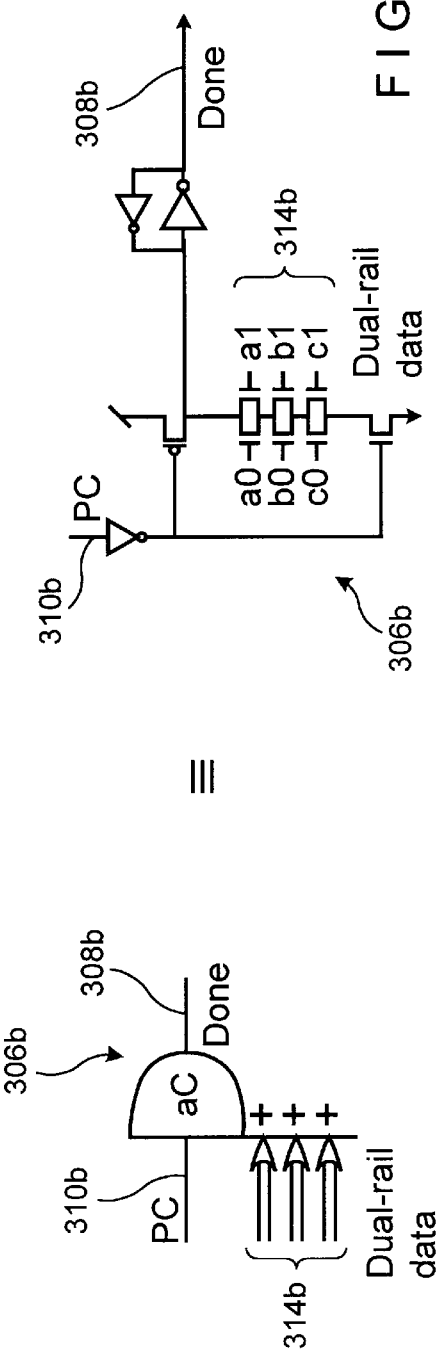
F I G. 10

US 6,590,424 B2

HIGH-THROUGHPUT ASYNCHRONOUS DYNAMIC PIPELINES

This application claims priority to U.S. Provisional Patent Application No. 60/218,546, which was filed on Jul. 12, 2000, entitled "High-throughput Asynchronous Pipelines for Fine-Grain Dynamic Datapaths," which is incorporated by reference in its entirety herein. This application also claims priority to U.S. Provisional Patent Application No. 60/240,655, which was filed on Oct. 6, 2000, entitled "Asynchronous Dynamic Pipeline Registers."

STATEMENT OF GOVERNMENT RIGHT

The present invention was made in part with support from United States National Science Foundation (NSF), grant no. CCR-97-34803. Accordingly, the United States Government may have certain rights to this invention.

CROSS-REFERENCE TO RELATED APPLICATION

BACKGROUND

1. Field of the Invention

This invention relates to asynchronous pipelines, and more particularly to latchless dynamic asynchronous digital pipelines providing high buffering and high throughput.

2. Background of the Related Art

There has been increasing demand for pipeline designs capable of multi-GigaHertz throughputs. Several novel synchronous pipelines have been developed for these high-speed applications. For example, in wave pipelining, multiple waves of data are propagated between two latches. However, this approach requires significant design effort, from the architectural level down to the layout level, for accurate balancing of path delays (including data-dependent delays), yet such systems remain highly vulnerable to process, temperature and voltage variations. Other aggressive synchronous approaches include clock-delayed domino, skew-tolerant domino, and self-resetting circuits. These approaches require complex timing constraints and lack elasticity. Moreover, high-speed global clock distribution for these circuits remains a major challenge. (See, e.g., "Motorola and Theseus Logic to jointly develop clockless ICs". http://motorola.com/SPS/MCORE/press_19oct99.htm1, October 1999, which is incorporated by reference in its entirety herein.)

Asynchronous design, which replaces global clocking with local handshaking, has the potential to make high speed design more feasible. (See C. H. van Berkel et al., "Scanning the Technology: Applications of Asynchronous Circuits," *Proceedings of the IEEE*, 87(2):223–233, February 1999, which is incorporated by reference in its entirety herein.) Asynchronous pipelines avoid the issues related to the distribution of a high-speed clock, e.g., wasteful clock power and management of clock skew. Moreover, the absence of a global clock imparts a natural elasticity to the pipeline since the number of data items in the pipeline is allowed to vary over time. Finally, the inherent flexibility of asynchronous components allows the pipeline to interface with varied environments operating at different rates; thus, asynchronous pipeline styles are useful for the design of system-on-a-chip.

Asynchronous design has also demonstrated a potential for lower power consumption and lower electromagnetic noise emission. Recent successes include a fully asynchronous 80C51 microcontroller developed by Philips for use in its commercial pagers and cell phones (as described in Hans van Gageldonk et al., "An Asynchronous Low-Power 80C51 Microcontroller," *Proc. Intl. Symp. Adv. Res. Async. Circ. Syst.* (ASYNC), pp. 96–107, 1998, which is incorporated by reference in its entirety herein), and the AMULET3 asynchronous microprocessor developed at the University of Manchester for use in a commercial telecom product (As described in J. D. Garside et al., "AMULET3i—An Asynchronous System-On-Chip," *Proc. Intl. Symp. Adv. Res. Async. Circ. Syst.* (ASYNC), pp. 162–175, April 2000, which is incorporated by reference in its entirety herein).

One prior art pipeline is Williams' PS0 dual-rail asynchronous pipeline (As described in T. Williams, *Self-Timed Rings and Their Application to Division*, Ph.D. Thesis, Stanford University, June 1991; T. Williams et al., "A Zero-Overhead Self Timed 160ns 54b CMOS Divider," *IEEE JSSC*, 26(11):1651–1661, Nov. 1991; T. Williams, "Analyzing and Improving the Latency and Throughput Performance of Self-timed Pipelines and Rings," *Proc. International Symposium on Circuits and Systems*, May 1992; and T. Williams, "Performance of Iterative Computation in Self-Timed Rings," *Journal of VLSI Signal Processing*, 7(½):17–31, February 1994, each of which is incorporated by reference in its entirety herein.). FIG. 1 illustrates Williams' PS0 pipeline 10. Each pipeline stage 12a, 12b, 12c comprises a dual-rail function block 14a, 14b, 14c and a completion detector 16a, 16b, 16c. The completion detectors 16a, 16b, 16c indicate validity or absence of data at the outputs of the associated function block 14a, 14b, 14c, respectively.

"Dual-rail" is a commonly-used scheme to implement an asynchronous datapath (See, e.g., M. Josephs et al., "Modeling and Design of Asynchronous Circuits," *Proceedings of the IEEE*, 87(2):234–242, February 1999; and C. Seitz, "System timing," in *Introduction to VLSI Systems*, Chapter 7, (Carver A. Mead et al., eds., 1980), which are incorporated by reference in their entirety herein.) In dual-rail design, two wires (or rails) are used to implement each bit. The wires indicate both the value of the bit, and its validity. The encodings of 01 and 10 correspond to valid data values 0 and 1, respectively. The encoding 00 indicates the reset or spacer state with no valid data, and 11 is an unused (illegal) encoding. Encodings on the datapath typically alternate between valid values and the reset state. Since the datapath itself indicates the validity of each bit, dual-rail is effective in designing asynchronous datapaths which are highly robust in the presence of arbitrary delays. In the exemplary embodiment, stage 12a, 12b, 12c receives dual-rail input 13a, 13b, 13c and provides dual-rail output 15a, 15b, 15c, respectively. Dual-rail output 15a of stage 12a passes data to dual-rail input 13b of stage 12b.

Each function block 14a, 14b, 14c is implemented using dynamic logic. A precharge/evaluate control input (PC) of each stage is tied to the output of the next stage's completion detector. For example, the precharge/evaluate control input (PC), of stage 12a is tied to the completion detector 16b of stage 12b and is passed to function block 14a on line 18a. (Similarly, the precharge/evaluate control input (PC) of stage 12b is tied to the completion detector 16c of stage 12c and is passed to function block 14b on line 18b.) A precharge logic block can hold its data outputs even when its inputs are reset, it also provides the functionality of an implicit latch. Therefore, a stage 12a, 12b, 12c has no explicit latch. FIG. 2 illustrates function block 14b. Although function blocks 14a and 14c are not illustrated, they are substantially identical to function block 14b, as is known in the art. FIG. 2 illustrates how a dual-rail AND gate, for example, would be implemented in dynamic logic; the dual-rail output 15b ($f_1$ and $f_0$) implements the AND of the dual-rail inputs 13b ($a_1 a_0$ and $b_1 b_0$).

The completion detector 16a, 16b, 16c at each stage 12a, 12b, 12c, respectively, signals the completion of every computation and precharge. An exemplary completion detector 16b is illustrated in FIGS. 3(a)–3(b). As illustrated in FIG. 3(a), a C-element 17b to combine all the results (See, FIG. 3). (Further details of the C-element are described in I. E. Sutherland. Micropipelines. *Communications of the ACM*, 32(6):720–738, June 1989, which is incorporated by reference in its entirety herein.). A C-element is a basic asynchronous stateholding element. More particularly, the output of an n-input C-element is high when all inputs are high, and is low when all inputs are low. If the inputs are not all high or all low, the C-element holds its previous value. It is typically implemented by a CMOS gate with an N-input series stack in both pull-up and pull-down, and an inverter on the output (with weak feedback inverter attached to maintain state). As illustrated in FIG. 3(b), the validity, or non-validity, of the data outputs 15b is checked by OR'ing the two rails for each individual bit using OR elements 17b, and then using the C-element 19b to combine all the results to create the done signal 18a.

The sequencing of pipeline control for the Williams' PS0 dual-rail pipeline is as follows: Stage N is precharged when stage N+1 finishes evaluation. Stage N evaluates when stage N+1 finishes precharge. Actual evaluation will commence only after valid data inputs have also been received from stage N−1. This protocol ensures that consecutive data tokens are always separated by reset tokens or spacers, where the data bits in a stage are reset to all 00 values.

The complete cycle of events for a pipeline stage is derived by observing how a single data token flows through an initially empty pipeline. The sequence of events from one evaluation by stage 12a to the next evaluation is: (i) Stage 12a evaluates, then (ii) stage 12b evaluates, then (iii) stage 12b's completion detector 16b detects completion of evaluation, and then (iv) stage 12a precharges. At the same time, after completing step (ii), (iii)' stage 12c evaluates, then (iv)' stage 12c 's completion detector 16c detects completion of evaluation, and initiates the precharge of stage 12b, then (v) stage 12b precharges, and finally, (vi) stage 12b's completion detector 16b detects completion of precharge, thereby releasing the precharge of stage 12a and enabling stage 12a to evaluate once again. Thus, there are six events in the complete cycle for a stage, from one evaluation to the next.

The complete cycle for a pipeline stage, traced above, consists of 3 evaluations, 2 completion detections and 1 precharge. The analytical pipeline cycle time, $T_{PS0}$, therefore is:

$$T_{PS0} = 3 \cdot t_{Eval} + 2 \cdot t_{CD} + t_{Prech} \quad (1)$$

where, $t_{Eval}$ and $t_{Prech}$ are the evaluation and precharge times for each stage, and $t_{CD}$ is the delay through each completion detector.

The per-stage forward latency, L, is defined as the time it takes the first data token, in an initially empty pipeline, to travel from the output of one stage to the output of the next stage. For PS0, the forward latency is simply the evaluation delay of a stage:

$$L_{PS0} = t_{Eval} \quad (2)$$

A disadvantage of this type of latch-free asynchronous dynamic pipelines (e.g., PS0), is that alternating stages usually must contain "spacers," or "reset tokens," limiting the pipeline capacity to 50%. Another disadvantage of the Williams pipeline 10 (PS0) is that it requires a number of synchronization points between stages. Moreover, William's maintains data integrity by constraining the interaction of pipeline stages, i.e., the precharge and evaluation of a stage are synchronized with specific events in neighboring stages.

Another prior art pipeline design called PA0, is described in T. E. Williams. "*Self-Timed Rings and their Application to Division*," Ph.D. thesis, Stanford University, June 1991, which is incorporated by reference in its entirety herein. The PA0 pipeline uses control inputs from two subsequent stages, instead of one. The structure of Williams' PA0 pipeline 20 is shown in FIG. 4. Each pipeline stage 21a, 21b, 21c has a function block 22a, 22b, 22c, a completion detector 24a, 24b, 24c, and an asymmetric C-element (hereinafter "aC" element) 26a, 26b, 26c. Each stage 21a, 21b, 21c receives a precharge control input 30a, 30b, 30c (PC) and an evaluate control input 28a, 28b, 28c (EVAL). The completion detector 24a, 24b, 24c produces an output which is the completion signal 32a, 32b, 32c. The aC element 26a, 26b, 26c produces an output 34a, 34b, 34c. The precharge control input 30a (PC) of stage 21a is the completion signal 32b from stage 20b. The evaluate control input 28a (EVAL) of stage 21a is the output 34b of aC element 26b, which is derived from the completion detector 24c of stage 21c.

The pipeline 20 (PA0) operates as follows. Stage N is driven into evaluation as soon as stage N+1 starts to precharge. For example, stage 21a begins to evaluate once stage 21b starts to precharge. Thus, the pipeline 20 (PA0) allows early evaluation. The "trigger signal" which causes the start of evaluation is EVAL=low. Stage N is precharged when N+1 is done evaluating (PC=high) and N+2 is done precharging (EVAL=high).

This stage's control is implemented by an aC element 26a, 26b, 26c, shown in FIG. 4, which adds a delay to the cycle time. More particularly, the aC element has two inverters in series in the critical path, e.g., 27a/29a, 27b/29b, 27c/29c. As described above, an early evaluation of stage N is enabled by the de-assertion of the trigger signal 28a, 28b, 28c (EVAL=low), which is an input to the control. In pipeline 20 (PA0), the aC element 26a, 26b, 26c holds this value, and evaluation persists until the desired precharge phase begins. The two inverters in the critical path add four inverter delays to the cycle time, because the critical path of pipeline 20 (PA0) for stage 21a goes through two of these aC elements, i.e., the aC element 26b of stage 21b and the aC element 26c of stage 21c, and therefore through inverters 27b/29b, 27c/29c.

Three recent, competitive asynchronous pipelines provide improved performance but suffer from numerous disadvantages which have been addressed by the digital signal processing pipeline apparatus in accordance with the invention.

Several variants of William's dual rail schemes have been proposed. For example, a design by Renaudin provides high storage capacity (as described in M. Renaudin et al. "New Asynchronous Pipeline Scheme: Application to the Design of a Self-Timed Ring Divider, *IEEE JSSC*, 31(7): 1001–1013, July 1996, which is incorporated by reference in its entirety herein). Renaudin's pipelines achieve 100% capacity without extra latches or "identity stages." Their approach locally manipulates the internal structure of the dynamic gate in order to provide increased capacity.

However, there are two significant disadvantages of Renaudin's pipelines. First, in Renaudin's pipelines, extra latching is achieved by modifying the output inverter of each dynamic gate into a gated inverter, through the use of additional transistors. A second disadvantage of Renaudin's pipelines is a relatively low throughput. In particular, Renaudin's pipelines are based on a much more conservative form of PS0 pipelines, referred to as the PC0 pipeline. Consequently, their throughput, while an improvement over the PC0 pipeline, is worse than even that of pipeline 10 (PS0).

In addition to the dual-rail datapaths, described above, single-rail designs are increasingly being used in asynchronous processing due to comparatively reduced area and power overhead. The classic single-rail, asynchronous pipelines introduced by Sutherland are called "micropipelines." (As described in I. E. Sutherland. Micropipelines. *Communications of the ACM*, 32(6):720–738, June 1989, which is incorporated by reference in its entirety herein.) This style uses elegant transition-signaling (2-phase) control, but has slow and complex capture-pass latches which limit performance. Several variants of micropipelines have been proposed using alternative latching or control structures.

The two single-rail FIFO designs by Molnar et al.—the asp* FIFO and the micropipelined FIFO—are among the most competitive pipelines presented in literature, with reported throughputs of 1.1 Giga and 1.7 Giga items/second in 0.6 μm CMOS (C. Molnar et al., "Two FIFO Ring Performance Experiments," *Proceedings of the IEEE*, 87(2):297–307, February 1999).

Molnar's first FIFO, asp*, has significant drawbacks. When processing logic is added to the pipeline stages, the throughput of the asp* FIFO is expected to significantly degrade relative to the pipeline designs described herein. This performance loss occurs because the asp* FIFO requires explicit latches to separate logic blocks. The latches are essential to the design; they ensure that the protocol will not result in data overruns. As a result, in asp* FIFO, with combinational logic distinct from latches, the penalty of logic processing can be significant. In addition, the asp* FIFO has complex timing assumptions which have not been explicitly formalized; in fact, an early version was unstable due to timing issues.

Molnar's second design, the micropipelined FIFO, also has several shortcomings. First, the micropipeline is actually composed of two parallel "half-rate" FIFO's, each providing only half of the total throughput (0.85 Giga items/second); thus, the net throughput of 1.7 Giga items/second is achieved only at a significant cost in area. Second, the micropipelined uses very expensive transition latches. Finally, a significant limitation of the micropipelined FIFO is that it cannot perform logic processing at all; i.e., it can only be used as a FIFO. The reason for this restriction is that it uses a complex latch structure in which parts of each latch are shared between adjacent stages. As a result, insertion of logic blocks between latches is not possible.

Among the fastest designs reported in literature are the IPCMOS pipelines, with throughputs of 3.3–4.5 GHz in a 0.18 μm CMOS process (S. Shuster et al., "Asynchronous Interlocked Pipelined CMOS Circuits Operating at 3.3–4.5 GHz, *Proceedings ISSCC*, February 2000). IPCMOS has disadvantages at the circuit as well as at the protocol levels. First, IPCMOS uses large and complex control circuits which have significant delays. Second, IPCMOS makes use of extremely aggressive circuit techniques, which require a significant effort of design and verification. For example, one of the gates in their "strobe" circuit potentially may have a short circuit through its pull-up and pull-down stacks, depending on the relative arrival times of inputs to the two stacks from multiple data streams. Their approach relies on a ratioing of the stacks to ensure correct output. Third, in IPCMOS, pipeline stages are enabled for evaluation only after the arrival of valid data inputs. Hence, the forward latency of a stage is poor, because of the delay to precharge-release the stage.

It is an object of the invention to provide a pipeline having protocols wherein no explicit latches are required.

It is an object of the invention to provide a pipeline having simple one-sided timing constraints, which may be easily satisfied.

It is an object of the invention to provide a pipeline having function blocks that may be enabled for evaluation before the arrival of data. Thus, data can simply ripple through each stage in succession.

It is an object of the invention to provide a pipeline in which a stage receives control signals from the next stage as well as from stages further down the pipeline.

It is an object of the invention to provide a pipeline in which a stage indicates to its previous stage that is about to complete an action is parallel with the completion of the action.

It is yet another object of the invention to provide a pipeline having reduced critical delays, smaller chip area, lower power consumption, and simple, small and fast control circuits to reduce overhead.

SUMMARY OF THE INVENTION

These and other objects of the invention which will become apparent with respect to the disclosure herein, are accomplished by a latchless dynamic asynchronous digital pipeline circuit for processing data in an environment comprising a first processing stage, a second processing stage and a third processing stage.

The first processing stage may be enabled to enter a first precharge phase and a first evaluate phase in response to a first precharge control signal and a second precharge control signal. The first precharge phase is enabled by the assertion of the first precharge control signal and the de-assertion of the second precharge control signal. The first evaluate phase is enabled by at least one of the de-assertion of the first precharge control signal and the assertion of the second precharge control signal. The first processing stage has a first data input for receiving the data for processing from the environment and a first data output for receiving the data processed by the first function block upon completion of the first evaluate phase.

The second processing stage is enabled to enter a second precharge phase and a second evaluate phase, and has a second data input for receiving the data for processing from the first data output and a second data output for receiving the data processed by the second function block upon completion of the second evaluate phase.

The second processing stage comprises a second completion generator provides an indication of the presence of the data on the second data output by asserting the first precharge control signal when data is present thereon.

The third processing stage is enabled to enter a third precharge phase and a third evaluate phase, and has a third data input for receiving the data for processing from the second data output and a third data output for receiving the data processed by the third function block upon completion of the third evaluate phase.

The third processing stage comprises a third completion generator providing an indication of the presence of data on the third data output by asserting the second precharge control signal when data is present thereon.

Another latchless dynamic asynchronous digital pipeline circuit for processing data in an environment is provided which provide an early indication the completion of the evaluate phase or the precharge phase of a processing stage. The pipeline circuit comprises a first processing stage and a second processing stage. The first processing stage comprises a first function block enabled to enter a first precharge phase and a first evaluate phase in response to a first precharge control signal, and has a first data input for receiving the data for processing from the environment and a first data output for receiving the data processed by the first function block upon completion of the first evaluate phase.

The second processing stage comprises a second function block enabled to enter a second precharge phase and a second evaluate phase in response to a second precharge control signal, and has a second data input for receiving the data for processing from the first data output and a second data output for broadcasting the data processed by the second function block.

The second processing stage has a completion generator responsive to the second precharge control signal and to the data from the first data output, and configured to provide an indication to the first processing stage of the phase for which the second function block has been enabled in parallel with such enablement.

In accordance with the invention, the objects as described above have been met, and the need in the art for a digital pipeline circuit having high throughput and low latency has been satisfied. Further features of the invention, its nature and various advantages will be more apparent from the accompanying drawings and the following detailed description of illustrative embodiments.

BRIEF DESCRIPTION OF THE DRAWINGS

FIG. 2 is a more detailed view of a portion of the pipeline illustrated in FIG. 1.

FIG. 3 is another more detailed view of a portion of the pipeline illustrated in FIG. 1

FIG. 6 is a detailed view of a portion of the pipeline illustrated in FIG. 5 in accordance with the invention.

FIG. 9 is a schematic view of a third embodiment of a pipeline in accordance with the invention.

FIG. 10 is a detailed view of a portion of the pipeline illustrated in FIG. 9 in accordance with the invention.

FIG. 11 is another detailed view of a portion of the pipeline illustrated in FIG. 9 in accordance with the invention.

FIG. 12($b$) is a detailed view of a portion of the pipeline illustrated in FIG. 12($a$) in accordance with the invention.

DETAILED DESCRIPTION OF THE EXEMPLARY EMBODIMENTS

The pipelining schemes described herein have general application. In addition, the pipelines are particularly suited for extremely high throughputs. To this end, extremely fine-grain ("gate-level") pipelining may be used, such that the datapath is sectioned into very narrow pipeline stages, each containing only a single level of logic. A further feature of these pipeline designs is that explicit latches may be eliminated through use of a dynamic circuit style. As will be described below, through the sequencing of control, the dynamic gates themselves naturally provide an implicit latching functionality (e.g., immunity of data to precharging inputs). The removal of explicit latches has the benefit of reduced critical delays, smaller chip area and lower power consumption.

Two specific optimizations are utilized in the novel pipeline designs: (i) "early evaluation," and (ii) "early done." In early evaluation, a pipeline stage uses control information not only from the subsequent stage, but also from stages further down the pipeline. This information is used to give the stage a headstart on its evaluation phase. In the second optimization, early done, a stage signals to its previous stage when it is about to precharge or evaluate, rather than after it has completed those actions. This information is used to give a pipeline stage a headstart both on its evaluation phase as well as its precharge phase. The net result of applying these two optimizations is a significant reduction in pipeline cycle time, and consequently a dramatic increase in throughput, with no net increase in latency.

Four exemplary embodiments of dual-rail pipeline styles, i.e., pipeline 100 and pipeline 200 (also referred to as "LP3/1"), pipeline 300 (also referred to as "LP2/2"), and pipeline 400 (also referred to as "LP2/1"), are presented herein. Pipelines 100 and 200 (LP3/1) use early evaluation, pipeline 300 (LP2/2) uses early done, and pipeline 400 (LP2/1) is a hybrid which combines both optimizations, as will be described in greater detail herein.

Figure 5:
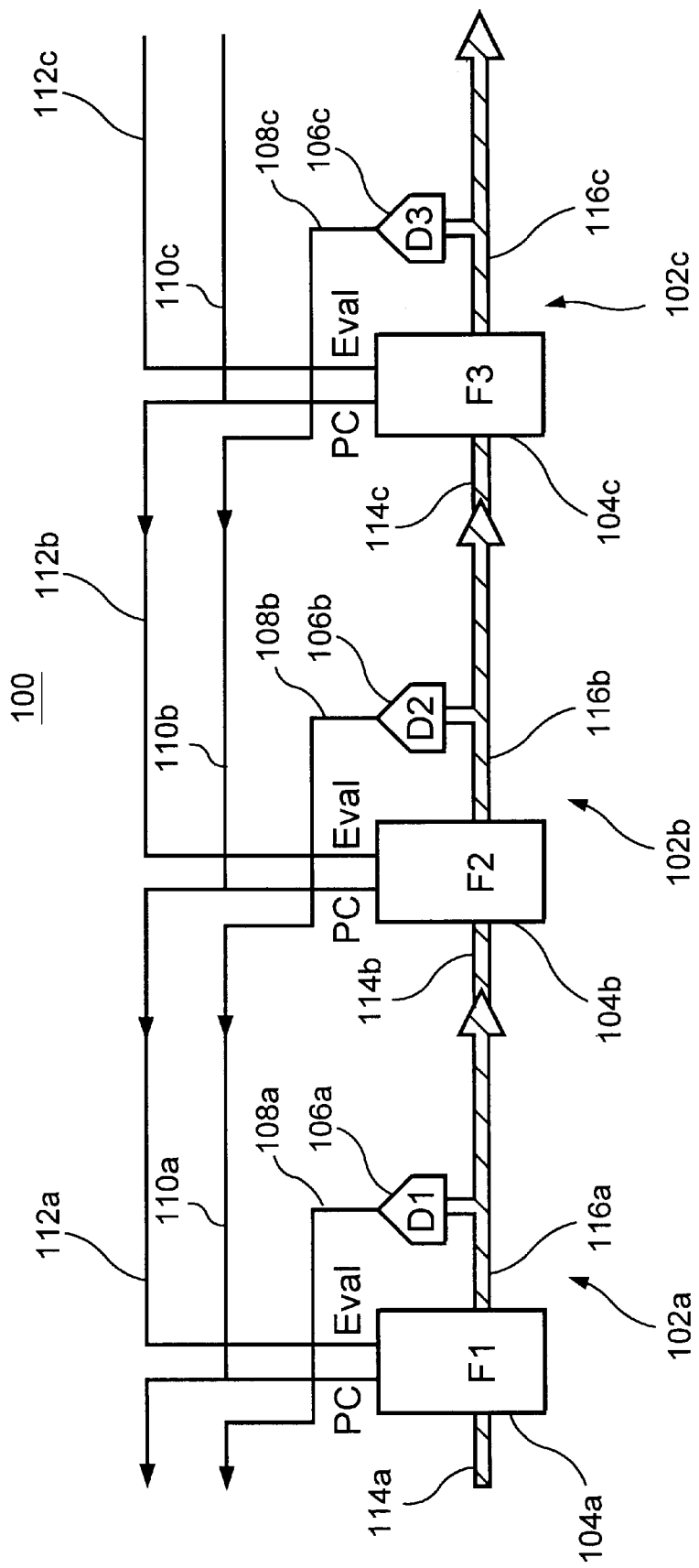
FIG. 5 is a schematic view of a first embodiment of a pipeline in accordance with the invention.

Pipeline 100 (LP3/1) comprises processing stages 102*a*, 102*b*, 102*c* each having a function block 104*a*, 104*b*, 104*c* and a completion detector 106*a*, 106*b*, 106*c*, respectively. (Although three processing stages are illustrated in FIG. 5, it is noted that any number of processing stages may be concatenated in accordance with the invention as described herein. Thus, stage 102*c* may receive inputs 110*c*, 112*c* from and provide outputs 116*c* to either a subsequent stage (not shown), or the environment (not shown) Similarly, stage 102*a* may receive input 114*a* from and provide outputs 108*a* to either the environment or a previous stage (not shown). The above description is applicable to all of the pipeline designs described herein.). Each processing stage 102*a*, 102*b*, 102*c* has a data input 114*a*, 114*b*, 114*c* and a data output 116*a*, 116*b*, 116*c*, respectively. Processing stage 102*a* is illustrated as the left-most stage in pipeline 100. Accordingly, stage 102*a* receives inputs 114*a* from the environment. Data outputs 116*a*, 116*b*, 116*c* receive data that has been processed by the function block 104*a*, 104*b*, 104c, respectively, upon completion of the evaluate phase of the respective function block. For consecutive stages 102a and 102b, for example, the data output 116a of stage 102a passes data to the data input 114b for stage 102b. Pipeline 100 (LP3/1) uses an early evaluation protocol, in which a pipeline stage 102a, 102b, 102c receives control information not only from the subsequent stage, but also from its successor. As a result, pipeline 100 (LP3/1) has a shorter cycle than Williams'pipeline 10 (PS0). More particularly, a complete cycle for a stage of pipeline 100 (LP3/1) comprises only four events. (In comparison, a stage of pipeline 10 (PS0) requires six events.) The pipeline-naming terminology used herein, i.e., LP3/1, is based on the number of events that fall in the evaluation phase, and the number of events that fall in the precharge phase. Thus, for pipeline 100 (LP3/1), it will be described herein that 3 out of the 4 events in every stage's cycle fall in its evaluation phase, and 1 event falls in its precharge phase.

Figure 1:
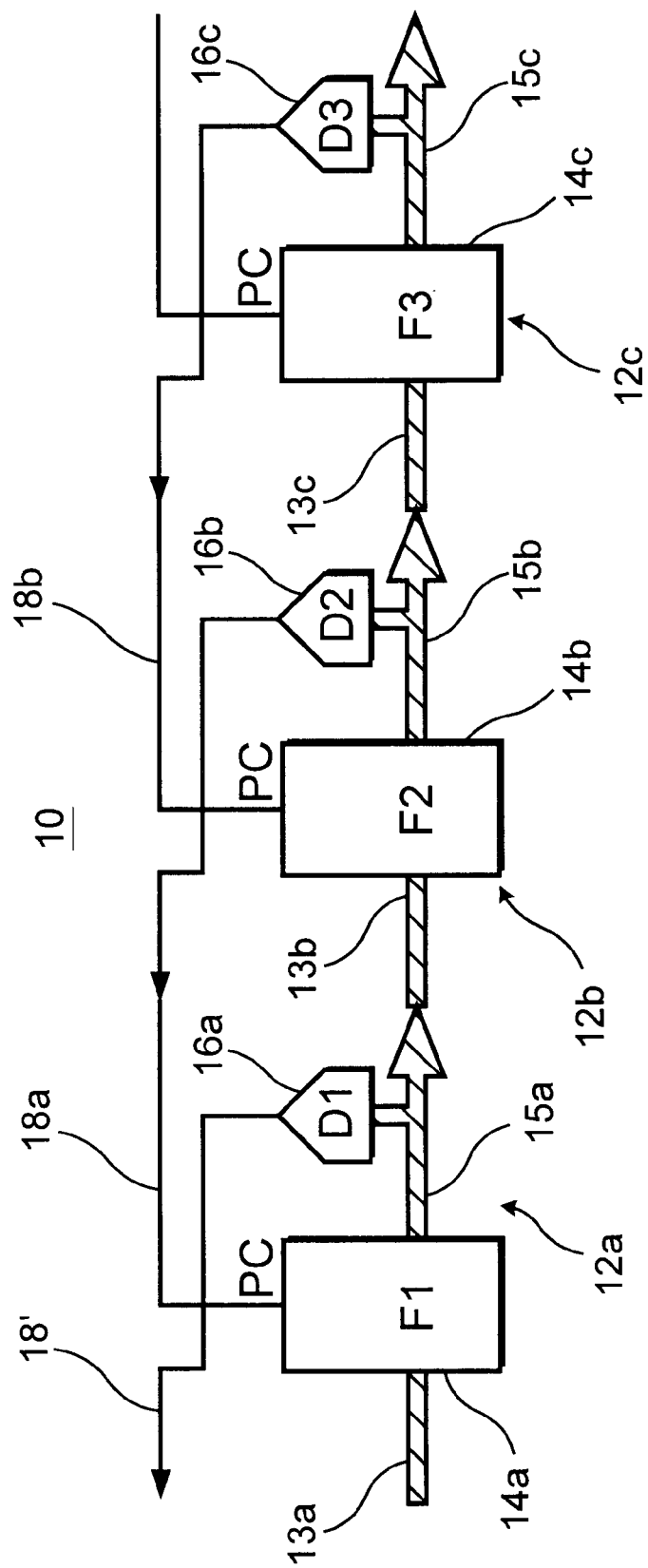
FIG. 1 is a schematic view of a prior art pipeline.

Each stage 102a, 102b, 102c has two control inputs: a precharge control input 110a, 110b, 110c (PC) and an evaluate control input 112a, 112b, 112c (EVAL). The precharge control input 110a, 110b, 110c (PC), comes from the next stage, which is similar to configuration of pipeline 10 (PS0), illustrated in FIG. 1. (For example, in the exemplary embodiment of pipeline 100 (LP3/1), the precharge control input 110a (PC) of stage 102a is the output 108b of completion detector 106b of stage 102b.) The evaluate control input (EVAL), comes from two stages ahead. (In the exemplary embodiment of pipeline 100, the evaluate control input 112a (EVAL) of stage 102a is the output 108c of the completion detector 106c of stage 102c.) As will be described below, this evaluate control input 112a, 112b, 112c (EVAL) is important to achieving a shorter cycle time.

A design feature of pipeline 100 (LP3/1) is that stage N can evaluate as soon as stage N+1 has started precharging, instead of waiting until stage N+1 has completed precharging. This idea can be used because a dynamic logic stage undergoing precharge is insensitive to changes on its inputs. (In general, this property is only true of fully-controlled (or "footed") dynamic logic, as is known in the art. All of the pipelines described herein use fully-controlled dynamic logic to utilize this property.) Therefore, as soon as stage N+1 begins to precharge, stage N can proceed with its next evaluation. Since stage N+1 begins precharging only after stage N+2 completes evaluation, the condition for evaluation is: Evaluate stage N when stage N+2 completes evaluation. The condition for precharge is the same as for the PS0 pipeline: Precharge stage N when stage N+1 completes evaluation. In the exemplary embodiment, stage 102a begins evaluation as soon as stage 102c has completed evaluation. Stage 102a begins precharging after stage 102b has completed evaluation. Therefore, stage 102a needs inputs from both the completion detector 106b of stage 102b as well as from the completion detector 106c of stage 102c.

FIG. 6 illustrates an implementation of one data output 116a of stage 102a of pipeline 100 (LP3/1). For simplicity, only one dynamic logic gate is shown inside the function block, but there will typically be several dynamic gates, one pair for each bit of dual-rail output data. The two control inputs, precharge control input 110a (PC) and the evaluate control input 112a (EVAL), may be combined. For example, a NAND2 gate 120a, with a "bubble" (i.e., an inverter) 121a on the evaluate control input 112a (EVAL), merges precharge control input 110a (PC) and the evaluate control input 112a (EVAL) into one signal 122a which controls the precharge and evaluation of the stage 102a. Signal 122a may be passed through control buffer 123a. Evaluation is enabled when either the evaluate control input 112a (EVAL) is asserted high, or the precharge control input 110a (PC) is de-asserted low, or both. The former condition, EVAL=high, corresponds to stage N+2, e.g., stage 102c completing its computation (i.e., stage N+1 starting its precharge; see FIG. 5). The latter condition, i.e., PC=low, is the same as the evaluation condition of the PS0 pipeline; and its role in pipeline 100 (LP3/1) is explained in greater detail below. Precharge is enabled when both PC is asserted high and EVAL is de-asserted low.

The completion detector 106a, 106b, 106c for each stage 102a, 102b, 102c respectively, is substantially identical to the completion detector 16b for pipeline 10 (PS0), described above and illustrated in FIGS. 3(a)–3(b). Thus, the validity of each of the data outputs 116a, illustrated in FIG. 6, is checked by OR'ing the two rails for each individual bit, and then using a C-element to combine all the results, thereby producing the output signal 108a. Completion detectors 106b and 106c are substantially identical to completion detector 106a as described herein.

Each processing stage N in pipeline 100 (LP3/1) may have two distinct control inputs, which are outputs from stages N+1 and N+2. (It is noted that another embodiment, i.e., pipeline 200 (LP3/1), has one control input, as described below.) The precharge phase of stage N begins after stage N+1 is done evaluating (i.e., precharge control input (PC) is asserted high), much like for pipeline 10 (PS0). However, when compared with pipeline 10 (PS0), the precharge phase for pipeline 100 (LP3/1) is shortened. More particularly, the precharge phase terminates when stage N+2 is done evaluating (i.e., the evaluate control input (EVAL) is asserted high). In contrast, for pipeline 100 (PS0), precharge terminates only stage N+1 is done precharging.

At this point, stage N enters its evaluate phase. The evaluate phase continues until two distinct conditions hold, which drive the stage into the next precharge: (i) stage N+1 has completed evaluation (PC is asserted high, which is similar to the PS0 pipeline) and (ii) stage N+2 has completed precharging (EVAL is de-asserted low). The NAND2 gate 120a in FIG. 6 (with a bubble on its EVAL input) implements these two conditions.

During the evaluate phase of pipeline 100 (LP3/1), the early evaluate control signal (EVAL) from stage N+2 may be non-persistent. For example, the evaluate control signal (EVAL) may be de-asserted low even before stage N has had a chance to evaluate its new data. However, one-sided timing constraints, described in greater detail below, are imposed to insure a correct evaluate phase. More particularly, the de-assertion of the precharge control signal (PC=low) will arrive in time to take over control of the evaluate phase, which will then be maintained until stage N has completed evaluating its inputs (as in the pipeline 10 (PS0)).

The complete cycle of events for a stage, say stage 102a, from one evaluation till the next can be derived from FIG. 5: (i) Stage 102a evaluates, (ii) stage 102b evaluates, (iii) stage 102b's completion detector 106b detects completion of stage 102b's evaluation, and then (iv) stage 102a precharges. At the same time, after completing step (ii), (iii)' stage 102c evaluates, and (iv)' stage 102c's completion detector 106c detects completion of stage 102c's evaluation, thereby enabling two subsequent events: both the precharge of stage 102b and the next evaluation of stage 102a ("early evaluation"). Thus, there are only four events in the complete cycle for a stage, from one evaluation to the next, down from the six events in the PS0 pipeline. This reduction by two events has been brought about by eliminating the two events of stage 102b's precharge phase from stage 102a's cycle.

The analytical cycle time of the pipeline 100 (LP3/1) is therefore:

$$T_{LP3/1} = 3 \cdot t_{Eval} + t_{CD} + t_{NAND2} \quad (3)$$

where $t_{NAND2}$ is the delay through the NAND2 gate 120a for the early evaluation signal (See FIG. 6). Thus, the cycle time of pipeline 100 (LP3/1) is shorter than that of PS0 by the following duration of time: $T_{Prech} + t_{CD} - t_{NAND2}$. (See equation 1, above.)

The per-stage forward latency is simply the evaluation delay of a stage, as in pipeline 10 (PS0):

$$L_{LP3/1} = t_{Eval} \quad (4)$$

The above approximations do not take into consideration that completion detectors 106a, 106b, and 106c in pipeline 100 (LP3/1) may be somewhat slower than those in pipeline 10 (PS0) due to greater capacitive loads. This increased loading is due to the need to "fork off," i.e., split, the indication of "done" by the completion detector to the two preceding stages instead of one. More refined results based on HSPICE simulations of the pipeline circuits are described below. The simulation results will indicate that, in spite of the overhead due to increased loading, pipeline 100 (LP3/1) has significantly higher throughput, in practice, than pipeline 10 (PS0).

Figure 7:
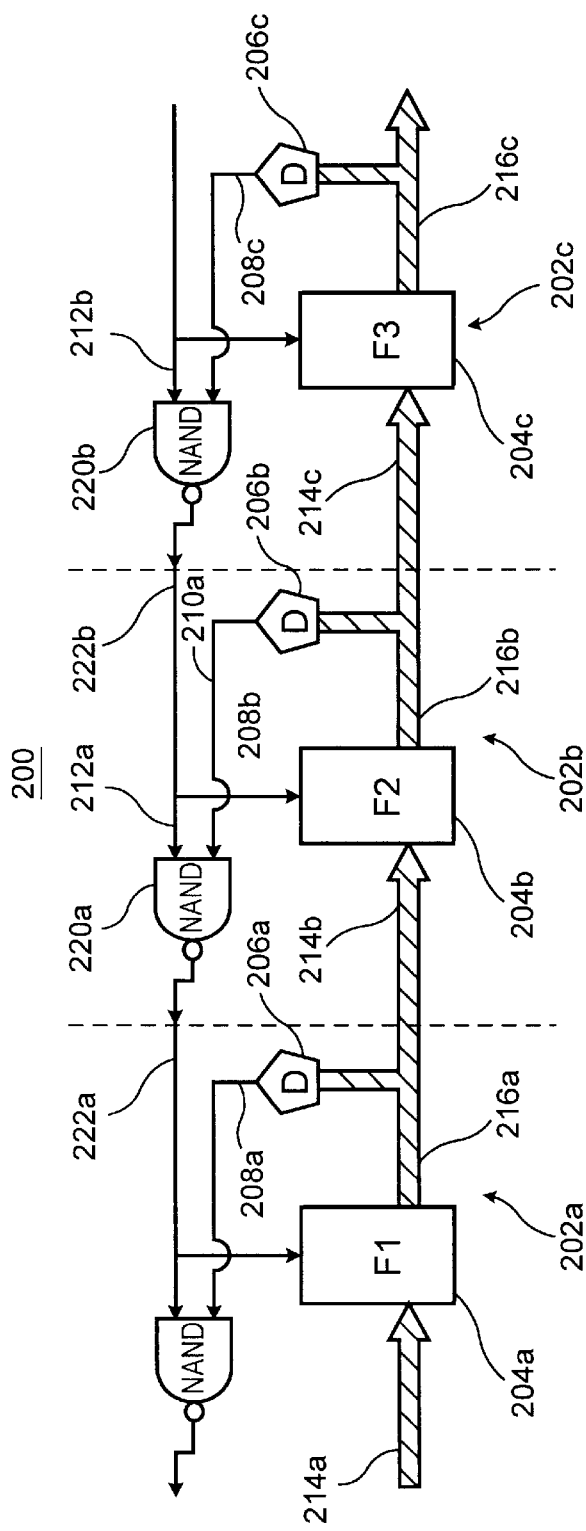
FIG. 7 is a schematic view of a second embodiment of a pipeline in accordance with the invention.
Figure 8:
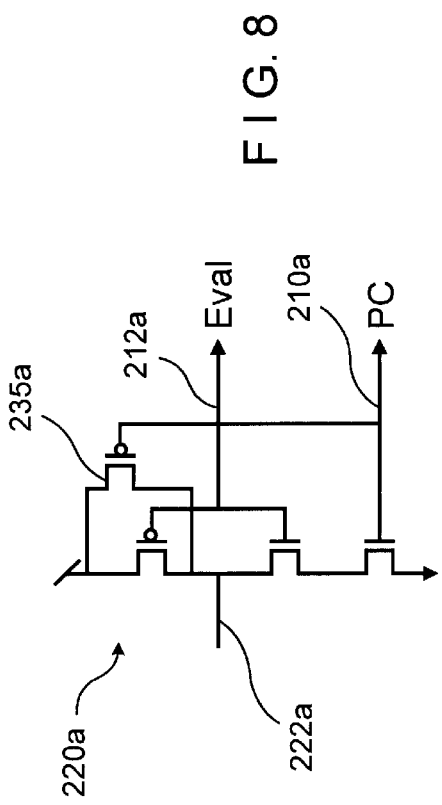
FIG. 8 is a detailed view of a portion of the pipeline illustrated in FIG. 7 in accordance with the invention.

Another exemplary embodiment of the LP3/1 pipeline is referred to herein as pipeline 200 (LP3/1) and illustrated in FIGS. 7–8. Pipeline 200 (LP3/1) is substantially identical to pipeline 100 (LP3/1), described above. Pipeline 200 (LP3/1) comprises processing stages 202a, 202b, 202c having a function block 204a, 204b, 204c and a completion detector 206a, 206b, 206c. Each processing stage 202a, 202b, 202c has a data input 214a, 214b, 214c, respectively, and a data output 216a, 216b, 216c. Processing stage 202a is illustrated as the left-most stage in pipeline 200. Accordingly, stage 202a receives inputs 214a from the environment. For consecutive stages 202a and 202b, for example, the data output 216a of stage 202a passes data to the data input 214b for stage 202b.

Pipeline 200 (LP3/1) has at least two differences from pipeline 100 (LP3/1). First, the pipeline implementation is modified to simplify the inter-stage communication. The only substantial change is to the NAND gate 220a, 220b (the NAND gate for stage 202c is not pictured in FIG. 7). The precharge control input 210a (PC) is the same as for pipeline 100; however, NAND gate 220a, 220b receives a different evaluate control input 212a, 212b (EVAL). In pipeline 200 (LP3/1), the evaluate control input 212a, 212b (EVAL) is not directly tapped off the completion detector of stage N+2. Rather, it is connected to the output of the NAND gate of stage N+1, e.g., NAND gate 220b of stage 202b. Since the completion signal 208b now undergoes an inversion through stage N+1's NAND gate 220b, there is no bubble on the input to the NAND gate 220a (i.e., when compared with NAND2 gate 120a of FIG. 6). Thus, the function computed by the NAND gate remains unchanged. The net impact is that stage N, e.g., stage 202a, now effectively communicates only with its immediate neighbor, stage N+1, e.g., stage 202b.

Second, through a redrawing of stage boundaries, stage N's NAND gate can be "pushed" into stage N+1, with no change in functionality. In FIG. 7, NAND gate 220a is represented in stage 202b, and NAND gate 220b is represented in stage 202c. (The stage boundaries are represented with a dashed line in the figure.) Combined with the above optimization, the final result is that stage N communicates on only a single wire with its neighbor N+1, rather than on two wires with two neighbors (as in pipeline 100 (LP3/1)). For example, the output 222a of NAND gate 220a is communicated from stage 202b to 202a as a single wire. An exemplary NAND gate 220a of pipeline 200 is illustrated in FIG. 8, and described in greater detail below.

A third exemplary embodiment of the dual-rail lookahead pipeline is referred to as pipeline 300 (LP2/2) and illustrated in FIGS. 9–11. Pipeline 300 (LP2/2) has a plurality of stages 302a, 302b, 302c, each having a function block 304a, 304b, 304c and completion detector 306a, 306b, 306c. An important feature of pipeline 300 (LP2/2) is that a pipeline stage 302a, 302b, 302c is now allowed to signal its previous stage when it is "about to evaluate (or precharge)" instead of after it has completed those actions. For example, when the function block 304b is enabled to precharge, its associated completion detector 306b can provide an indication to the previous processing stage 302b that function block 304b has completed precharge. This indication is provided in parallel with the enablement of function block 304b to begin precharge. Similarly, when the function block 304b is enabled to evaluate, and valid data inputs have arrived on 314b, its associated completion detector 306b provides an indication to the previous processing stage 302b that function block 304b has completed evaluation. This indication is provided in parallel with the enablement of function block 304b to begin evaluation. Thus, this pipeline uses an "early done" protocol.

Pipeline 300 (LP2/2) has a shorter cycle time than the PS0 pipeline. Similar to pipelines 100 and 200 (LP3/1), the cycle of a stage 302a, 302b, 302c of pipeline 300 (LP2/2) consists of four events. Moreover, these pipelines have another desirable feature: unlike pipeline 100 (LP3/1), the stages 302a, 302b, 302c of pipeline 300 (LP2/2) have only one control input 310a, 310b, 310c as opposed to two, thereby reducing loading on the completion detectors.

The processing stages 302a, 302b, 302c are substantially identical to those used in the PS0 pipeline. However, stages 302a, 302b, 302c have a difference, i.e., the completion detectors 306a, 306b, 306c are placed before their functional blocks 304a, 304b, 304c. This placement of the completion detectors 306a, 306b, 306c allows the previous pipeline stage know when the current stage is about to evaluate (or precharge).

A completion detector, such as completion detectors 306a, 306b, 306c, has several modifications from the completion detectors described above in order to generate the "early done" signal (FIGS. 10–11). More particularly, the completion detector 306a, 306b, 306c receives the data input 314a, 314b, 314c for the current stage 302a, 302b, 302c, respectively, and an additional input, i.e., the precharge control input 310a, 310b, 310c (PC), which is the done signal 308b, 308c of the subsequent stage 302b, 302c, respectively. The functionality of the completion detector 306a, 306b, 306c is as follows. The completion detector 306a, 306b, 306c asserts the respective done signal 308a, 308b, 308c (DONE=high) when the stage 302a, 302b, 302c is about to evaluate. More particularly, (i) the stage 302a, 302b, 302c is enabled to evaluate (the precharge control input 310a, 310b, 310c (PC) is de-asserted low), and (ii) the stage 302a, 302b, 302c has valid dual-rail inputs 314a, 314b, 314c. The completion detector 306a, 306b, 306c de-asserts the done signal 308a, 308b, 308c (DONE=low) when the stage 302a, 302b, 302c is about to precharge, i.e., the precharge control input 310a, 310b, 310c (PC) is asserted high. Thus, the done signal 308a, 308b, 308c (DONE) is produced in parallel with the actual precharge or evaluation by the associated function block, instead of after its completion. The conditions described above are asymmetric, since only a single condition (i.e., assertion of precharge control signal 310a, 310b, 310c (PC=high)) enables the stage 302a, 302b, 302c to precharge and its completion detector 306a, 306b, 306c to indicate that precharge is complete, whereas two conditions must hold for the stage 302a, 302b, 302c to evaluate and its completion detector 306a, 306b, 306c to indicate completion of evaluation (i.e., de-assertion of precharge control signal 310a, 310b, 310c (PC=low), as well as the presence of valid data at stage inputs 314a, 314b, 314c).

The completion detector 306a, 306b, 306c for pipeline 300 (LP2/2) is implemented using an aC element, and an exemplary completion detector 306b is illustrated in FIGS. 10–11. Completion detectors 306a, 306c, not shown in FIG. 11, are substantially identical to completion detector 306b. (Further details of aC elements are described in S. B. Furber et al., "Dynamic Logic in Four-Phase Micropipelines," *Proc. Intl. Symp. Adv. Res. Async. Circ. Syst.* (ASYNC), 1996, which is incorporated by reference in its entirety herein.). For purposes of this invention, an aC element, as is known in the art, has three types of inputs: (1) those that are marked "+", (2) those marked "−", and (3) "unmarked" inputs. The output of the aC element is set high when all the unmarked inputs and all the "+" inputs go high. Conversely, the aC element output is reset low when all the unmarked inputs and all the "−" inputs go low. For any other combination, the aC element holds its output value. The particular aC element used in completion detector 306b illustrated in FIG. 10 is a degenerate special case since it has no "−" inputs, and has only one unmarked input. Completion detector 306a, 306b, 306c can be regarded as a precharged dynamic gate, which de-asserts the done signal 308b (Done) whenever the precharge control signal 310b (PC) is asserted.

A complete cycle of events for stage 302b can be traced in FIG. 9. From one evaluation to the next, it consists of four events: (i) stage 302b evaluates, (ii) stage 302b's completion detector 306b detects "early done" of stage 302b's evaluation (in parallel with stage 302b's evaluation), thereby asserting the precharge control input 310a (PC) of stage 302a, and then (iii) stage 302b precharges. At the same time, after completing step (i), (ii)' stage 302b evaluates, (iii)' stage 302c's completion detector 306c detects "early done" of stage 302c's evaluation (in parallel with stage 302c's evaluation), thereby asserting the precharge control input 310b (PC) of stage 302b, and (iv) stage 302b's completion detector 306b detects "early done" of stage 302b's precharge (in parallel with stage 302b's precharge), thereby enabling stage 302a to evaluate once again in the next step.

Thus, the analytical cycle time of the pipeline is:

$$T_{LP2/2}=2 \cdot t_{Eval}+2 \cdot t_{CD} \quad (5)$$

which is $t_{Eval}+t_{Prech}$ shorter than that of pipeline 10 (PS0). The latency is identical to that of pipeline 10 (PS0) and pipeline 100 (LP3/1):

$$L_{LP2/2}=t_{Eval} \quad (6)$$

Figures 12A, 12B:
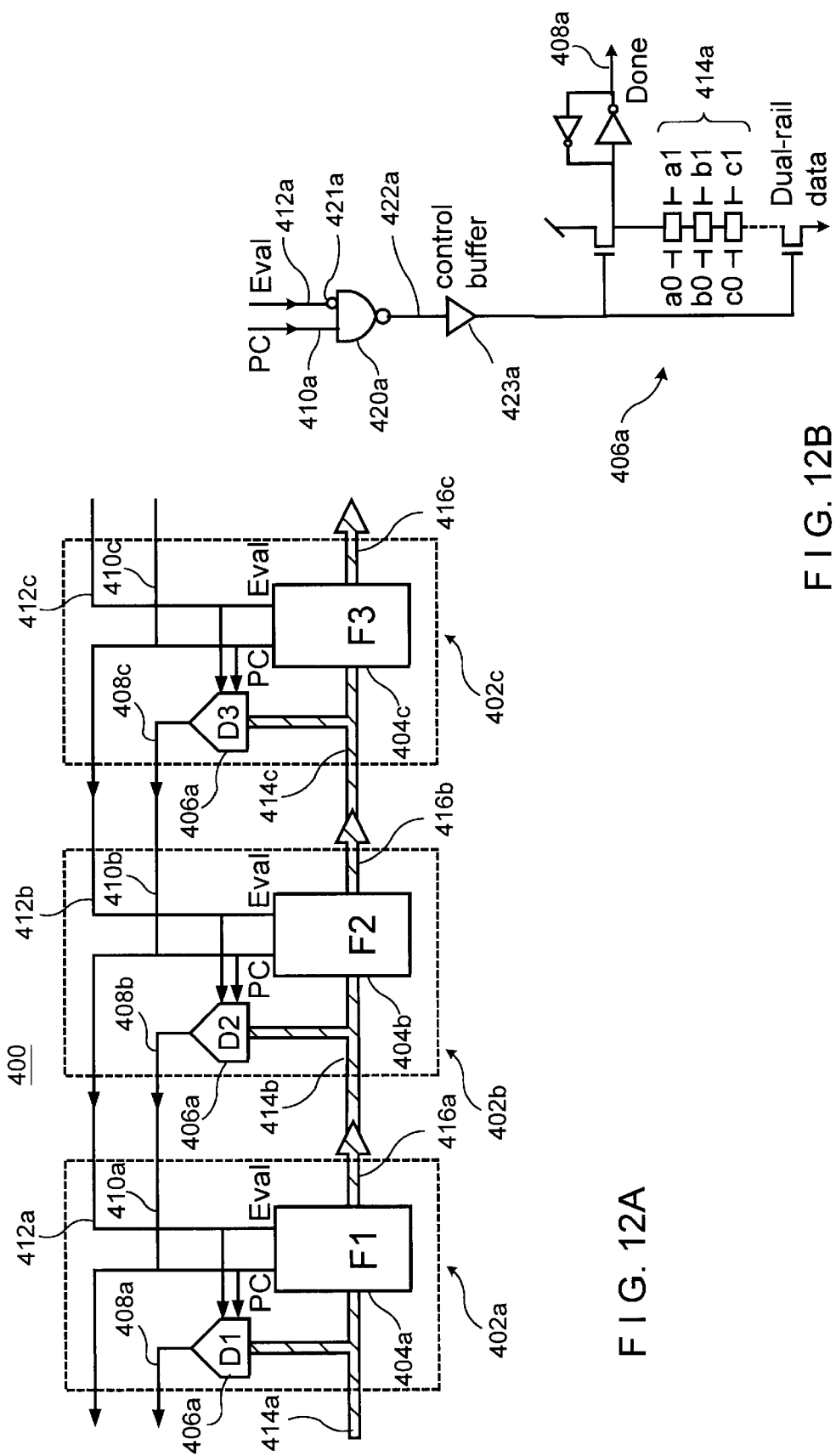
FIG. 12($a$) is a schematic view of a fourth embodiment of a pipeline in accordance with the invention.

A fourth exemplary embodiment of the dual-rail lookahead pipeline is referred to as pipeline 400 (LP2/1) and illustrated in FIG. 12(a). Pipeline 400 (LP2/1) incorporates many of the features of pipelines 100, 200, and 300. As illustrated in FIG. 12, pipeline 400 comprises a plurality of processing stages 402a, 402b, 402c, each having a function block 402a, 402b, 402c and a completion detector 406a, 406b, 406c. Signals 408a, 408b, 408c are the outputs of each of the completion detectors 406a, 406b, 406c respectively. The precharge control input 410a (PC) to completion detector 408a of stage N, e.g., stage 402a, is the output 408b of completion detector 406b of stage N+1, e.g., stage 402b. The evaluate control input 412a (EVAL) to completion detector 408a of stage N, e.g., stage 402a, is the output 408c of completion detector 406c of stage N+1 e.g., stage 402c.

An exemplary completion detector 406a for pipeline 400 (LP2/1) is illustrated in FIG. 12(b). (Completion detectors 406b, 406c, not shown in FIG. 12(a), are substantially identical to completion detector 406a.) Completion detector 406a is substantially identical to completion detector 306b (as illustrated in FIG. 11) with the differences noted herein. Completion detector 406a receives both data inputs 414a from the previous stage (not shown) as well as precharge control input 410a (PC) from the following stage 402b. In contrast to completion detector 306b, completion detector 406a also receives evaluate control input 412a (EVAL) from stage 402c. A NAND2 gate 420a, with a bubble on the evaluate control input 412a (EVAL), merges precharge control input 410a (PC) and the evaluate control input 412a (EVAL) into one signal 422a, which may pass through buffer 423a. The precharge control signal 410a, 410b, 401c (PC) and evaluate control signal 412a, 412b, 412c (EVAL) are also merged to a single signal within function block 402a, 402b, 402c, respectively, using a NAND2 gate and control buffer, in the same manner as within function block 104a (see FIG. 6).

Pipeline 400 (LP2/1) incorporates both the "early evaluation" feature of pipelines 100 and 200 (LP3/1) and the "early done" feature of pipeline 300 (LP2/2). Consequently, pipeline 400 (LP2/1) has the shortest analytical cycle time of the pipelines described above. More particularly, a cycle of a stage 402a, 402b, 402c consists of only three events. Each stage 402a, 402b, 402c uses information from two succeeding stages (as in pipelines 100 and 200 (LP3/1)), and also employs early completion detection (as in pipeline 300 (LP2/2)).

A complete cycle of events for stage 402a can again be traced in FIG. 12(a). From one evaluation to the next it consists of three events: (i) stage 402a evaluates, (ii) stage 402b's completion detector 406b detects "early done" of stage 402b's evaluation (in parallel with stage 402b's evaluation), thereby asserting the precharge control of stage 402a, and then (iii) stage 402a precharges. At the same time, after completing step (i), (ii)' stage 402b evaluates, and (iii)' stage 3's completion detector detects the "early done" of stage 3's evaluation (in parallel with stage 402c's evaluation), thus enabling the evaluation of stage 402a in the next step. Thus, the analytical cycle time is:

$$T_{LP2/1}=2 \cdot t_{Eval}+t_{CD}+t_{NAND2} \quad (7)$$

which is $t_{Eval}+t_{Prech}+t_{CD}-t_{NAND2}$ shorter than that of PS0. Once again, the latency is identical to that of PS0:

$$L_{LP2/1}=t_{Eval} \quad (8)$$

Each of the dual-rail pipeline designs 100, 200, 300, and 400 requires certain one-sided timing constraints to be satisfied for correct operation, described herein. Detailed HSPICE simulations, described below, verify that all of these timing constraints can easily be satisfied in practice.

Pipelines 100 and 200 (LP3/1) and pipeline 400 (LP2/1) have a shorter precharge phase than pipeline 10 (PS0), since the start of the evaluation phase is advanced by two time steps. (The "1" in their designation indicates this fact: their precharge phase is only 1 "unit" long, where a "unit" is approximately the amount of time for one stage evaluation, or one stage reset, or one completion detection. Using the same terminology, the PS0 pipeline would be designated "3/3.") For correct precharge, the precharge of a stage should be complete before the stage receives the asserted evaluation control signal (EVAL=high). That is, a minimum precharge width must be enforced.

The appropriate timing constraint for the pipelines 100 and 200 (LP3/1) is described herein. Using as a reference the instant stage N+1 finishes evaluating, stage N receives the precharge signal at time ${}^tCD_{N+1}\uparrow$, where ${}^tCD_{N+1}\uparrow$ is the time it takes for stage N+1's completion detector to switch high. (The time period ${}^tCD_{N+1}\uparrow$ is the delay associated with detection of stage N+1's evaluation, and ${}^tCD_{N+1}\downarrow$ is the delay associated with detection of stage N+1's reset.) Also, from the same reference, the evaluate control signal (EVAL) for stage N goes high at time ${}^tEVAL_{N+2}+{}^tCD_{N+2}\uparrow$. Therefore, for correct precharge, the precharge width $t_{Prech}$ must satisfy:

$$t_{PrechN} \leq t_{EvalN+2} + (t_{CDN+2\uparrow} - t_{CDN+1\uparrow}) \tag{9}$$

Assuming that all stages are similar and that both transitions of a completion detector are equally fast, the constraint can be approximated as:

$$t_{prech} \leq t_{Eval} \tag{10}$$

The duration of the evaluation phase may be increased by the additional inverter delay which the EVAL=high signal must go through at the inputs of the NAND gate. (See, for example, bubble 121a, implemented as a distinct inverter, on the evaluate control input 112a in FIG. 6, as well as inverter bubble 421a on evaluate control input 412a in FIG. 12(b), and inverter bubble on the evaluate input 612a on gate 606a of FIG. 14.) This inverter has the effect of delaying precharge release by $t_{bubble\downarrow}$ when the evaluate control signal 112a, 412a, 612a (EVAL) is asserted. Second, the transistors in the NAND gate may be sized asymmetrically, so that the up-transition is slower than the down-transition. Consequently, a NAND gate having transistors sized in this manner will switch faster when initiating precharge, and switch slower when terminating precharge, i.e., the delay, $t_{NAND2\downarrow}$ in starting precharge after precharge control PC is asserted, is shorter than the delay, $t_{NAND2\uparrow}$, in terminating precharge. Taking into account these additional delays, the timing constraint of equation 10 may also be expressed as:

$$t_{NAND2\downarrow} + t_{Prech} \leq t_{Eval} + t_{bubble\downarrow} + t_{NAND2\uparrow} \tag{10a}$$

As described below in connection with the simulations, this constraint is generally easily satisfied.

Another requirement for correct operation of the evaluation phase of pipeline circuits that use "early evaluation," i.e., pipelines 100, 200 (LP3/1) and pipeline 400 (LP2/1) is that the "takeover" signal, i.e., the de-assertion of the precharge control signal (PC=low), arrive at the inputs of the NAND gate before the non-persistent evaluate control signal is de-asserted (EVAL=low). This requirement is needed to insure that the control maintains a glitch-free evaluation phase whenever early evaluation is used.

Exemplary constraints for pipelines 100, 200 (LP3/1) are described below. The following analysis calculates the time at which stage N's EVAL is de-asserted low, and the time at which stage N takeover signal appears. The reference time 0 is set at the point when stage N+2 has just completed evaluation, which will start the early evaluation of stage N.

The time instant when EVAL for stage N is de-asserted low (from stage N+2) is given by:

$${}^tEval_{N+3} + {}^tCD_{N+3\uparrow} {}^tPrech_{N+2} + {}^tCD_{N+2\downarrow} \tag{11}$$

Similarly, the takeover signal, PC, of stage N is asserted low (from stage N+1) at time:

$${}^tCD_{N+2\uparrow} + {}^tPrech_{N+1} + {}^tCD_{N+1\downarrow} \tag{12}$$

As is known in the art, a transistor requires a setup time, $t_{setup}$, to "warm up" once it receives an enabling input, before it can begin to conduct electrical current. Therefore, to maintain uninterrupted evaluation, the takeover should arrive at least a setup time, $t_{setup}$, before EVAL is de-asserted:

$${}^tCD_{N+2\uparrow} + {}^tPrech_{N+1} + {}^tCD_{N+1\downarrow} + {}^tsetup \leq {}^tEval_{N+3} + {}^tCD_{N+3\uparrow} + {}^tPrech_{N+2} + {}^tCD_{N+2\downarrow} \tag{13}$$

Assuming all stages are similar, this constraint may be approximated as:

$${}^tEval \geq {}^tsetup \tag{14}$$

This constraint is also easily satisfied since the setup time of a transistor is usually less than the evaluation time of a stage. Moreover, the inverter bubble 121a, 421a, on the evaluate control input 112a, 412a, 612a (EVAL) adds additional delay, $t_{bubble\downarrow}$, during the de-assertion of this signal. In the exemplary embodiment, the inverter bubble may add a delay of about 0.16 ns to further increase the safety margin. A more accurate expression of the safe takeover timing constraint (equation 14) is:

$$t_{Eval} + t_{bubble\downarrow} \geq t_{setup} \tag{14a}$$

In addition, pipeline 300 (LP2/2) and pipeline 400 (LP2/1), which use "early done" protocol have a data input requirement. More particularly, in pipeline 300 (LP2/2) and pipeline 400 (LP2/1), the data inputs 314a/314b/314c and 414a/414b/414c to an evaluating stage 302a/302b/302c and 402a/402b/402c, respectively, must be held valid long enough for the stage to complete evaluation, before the inputs are reset. That is, the "early done" path through the completion detector must not reset the previous stage before the current stage has effectively absorbed its data inputs. If the time for a precharge-released dynamic gate to absorb its input is $t_{hold}$, then the input hold time constraint is:

$${}^thold \leq {}^tCD_{N\downarrow} + {}^tPrech_{N-1} \tag{15}$$

Assuming all stages are identical, this constraint becomes:

$${}^tCD\uparrow \geq {}^thold - {}^tPrech_{N-1} \tag{16}$$

According to this constraint, the completion detectors cannot be "too fast." This constraint is also easily satisfied in practice.

Referring to the novel pipeline 200 (LP3/1), described above and the pipeline 20 (PA0), also described above, there are some similarities in the underlying protocol. However, pipeline 20 (PA0) uses a different implementation which is not able to fully take advantage of the new protocol of pipeline 200 (LP3/1). As a result, the critical paths are significantly longer in pipeline 20 (PA0). In addition, the two styles differ in the manner in which their stages interact. For example, each pipeline stage 21a, 21b, 21c and 202a, 202b, 202c of pipeline 20 (PA0) and pipeline 200 (LP3/1), respectively, receives two control inputs, PC and EVAL. The PC input of stage N is the completion signal from stage N+1. The EVAL input of N is derived from the completion detector of stage N+2.

Figure 4:
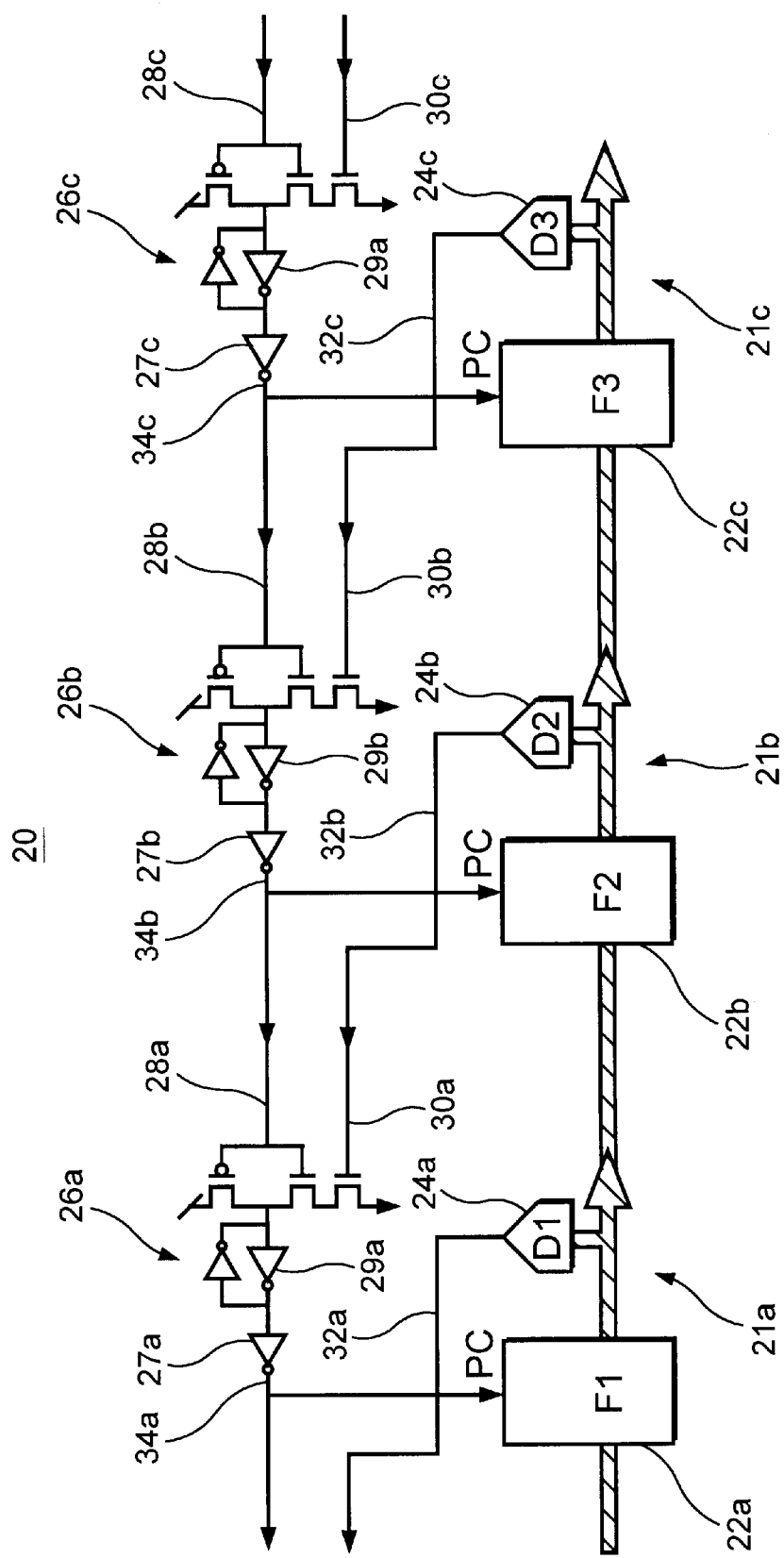
FIG. 4 is a schematic view of another prior art pipeline.

The pipeline 20 (PA0) operates as described above. However, there is an important difference in the controls of pipeline 20 (PA0) and pipeline 200 (LP3/1). The control of pipeline 20 (PA0) uses an aC element 26a, 26b, 26c (FIG. 4), whereas the control of pipeline 200 (LP3/1) uses a NAND2 gate 220a, 220b, 220c (FIG. 7). The control circuitry of pipeline 200 (LP3/1) is simplified by eliminating the aC element and its associated delays, by imposing an additional timing requirement on the interaction between stages. The net result is not only a simpler control circuit and the removal of two inverters in series from the critical path.

The timing requirement for pipeline 200 (LP3/1) concerns the arrival of inputs to the NAND2 gate 220a, 220b, 220c. In the pipeline 20 (PA0) and pipeline 200 (LP3/1), an early evaluation of stage N is enabled by the trigger signal, i.e., the de-assertion of the evaluate control signal 28a, 28b, 28c for pipeline 20 and 212a, 212b, 212c for pipeline 200 (EVAL= low), which is an input to the control. In pipeline 20 (PA0), the C-element 26a, 26b, 26c holds this value, and evaluation persists, until the desired precharge phase begins. In contrast, in pipeline 200 (LP3/1), the de-assertion of the evaluate control signal 212a, 212b, 212c (EVAL=low) also enables an early evaluation of stage N. However, this trigger signal may be non-persistent. Consequently, the control output could incorrectly get de-asserted. Therefore, for correct operation, a takeover signal, i.e., the de-assertion of the precharge control signal 208a, 208b, 208c (PC=low) is required to arrive at the gate input, before the evaluate control signal 212a, 212b, 212c is de-asserted (EVAL=low) (see Equation 14, above).

Once this timing assumption on the arrival of the precharge control signal 208a, 208b, 208c (PC) is satisfied, the aC element 26a, 26b, 26c of pipeline 20 can safely be replaced by the combination gate 220a, 220b, 220c. As shown in FIG. 8, the exemplary NAND2 gate 220a is identical to the logic portion of the aC element 26a, 26b, 26c, but with one extra parallel PMOS transistor 235a, controlled by precharge control signal 210a (PC). This modification makes the gate 220a fully complementary, hence the pair of inverters 27a/29a, 27b/29b, 27c/29c for each aC element 26a illustrated in FIG. 4 can be deleted. The net effect of eliminating two inverters from the critical path is the elimination of four inverter delays from the cycle time of the pipeline 200 (LP3/1) over pipeline 20 (PA0), because PA0's critical path for stage N goes through two of these aC elements: the aC element of stage N+1 and that of stage N+2. As described in greater detail below, pipeline 200 (LP3/1) provides a significant throughput improvement over pipeline 20 (PA0).

Dual-rail datapaths allow variable-speed completion and have been effectively used in a number of applications. In comparison, single-rail design has much wider applicability in the synchronous world, and several asynchronous groups have recently moved from dual- to single-rail design (As described in A. M. G. Peeters, "Single-Rail Handshake Circuits," Ph.D. thesis, Eindhoven University of Tech., June 1996, which is incorporated by reference in its entirety herein). Single-rail lookahead pipelines may also provide advantages over dual-rail pipelines in terms of reduced area and power overhead. The single-rail lookahead pipelines may make used of a commonly-used approach called "bundled-data" in which synchronous function blocks can be used along with attached matched delays, described in greater detail in the exemplary embodiments below.

(Bundled data is also described in C. Seitz, "System timing," *Introduction to VLSI Systems,* incorporated by reference above; Al Davis et al., "Asynchronous circuit design: Motivation, background, and methods," *Asynchronous Digital Circuit Design,* (Graham Birtwistle et al., eds., 1995) pages 1–49, which is incorporated by reference in its entirety herein).

Two exemplary single-rail lookahead pipelines are described herein. The first exemplary single-rail pipeline 500 (also referred to as "$LP_{sr}2/2$") is similar to pipeline 300 (LP2/2), with differences related to adapting pipeline 300 to single-rail datapaths. As with pipeline 300 (LP2/2), an early done optimization is used with pipeline 500 ($LP_{sr}2/2$). The second exemplary single-rail pipeline 600 (also referred to as "$LP_{sr}2/1$") is similar to pipeline 400 (LP2/1), with differences related to a single-rail datapath configuration. As with pipeline 400 (LP2/1), pipeline 600 ($LP_{sr}2/1$) adds the further improvement of early evaluate. Pipeline 500 ($LP_{sr}2/2$) and pipeline 600 ($LP_{sr}2/1$) operate correctly under simple, explicit and easily satisfiable one-sided timing constraints as will be described in greater detail below.

Figure 13:
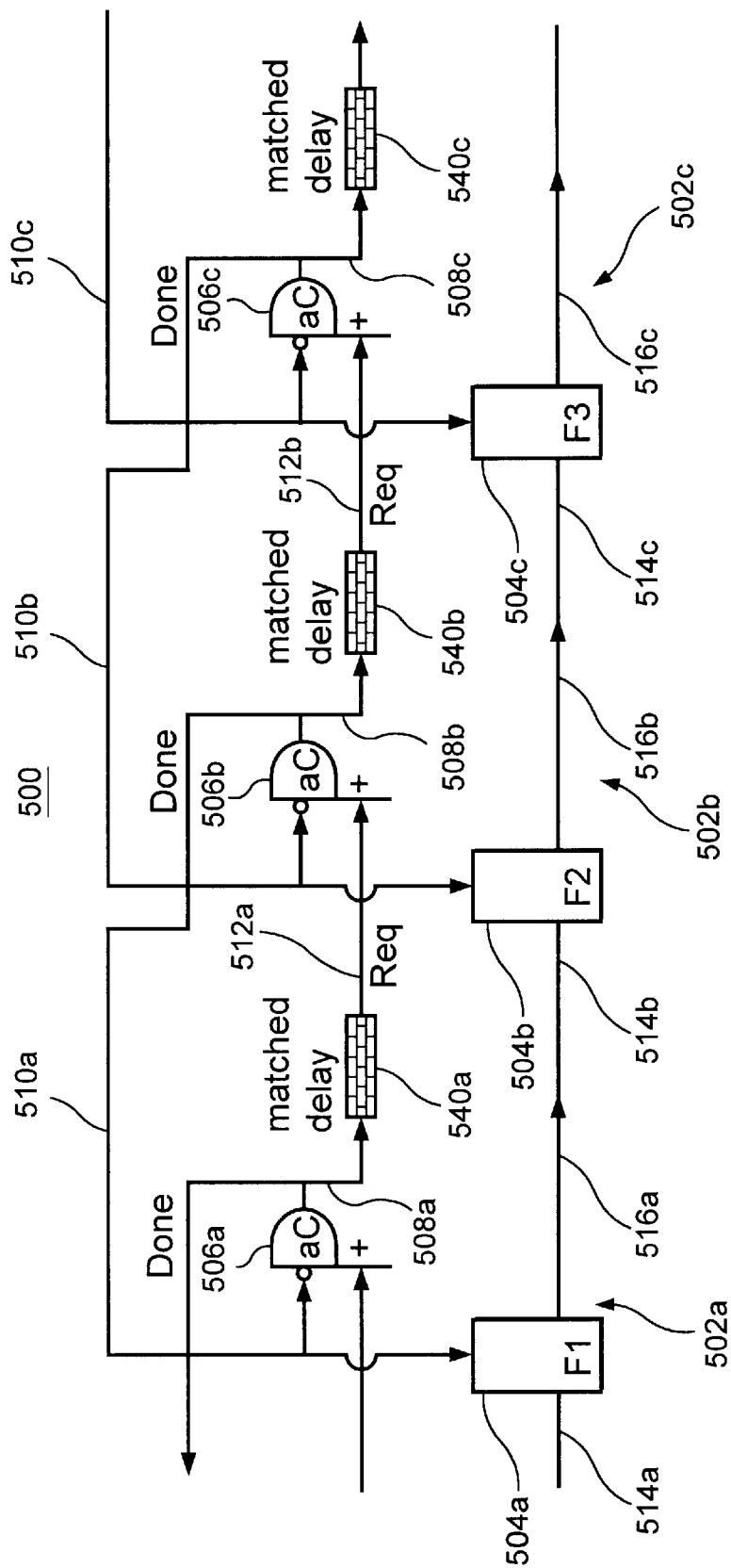
FIG. 13 is a schematic view of a fifth embodiment of a pipeline in accordance with the invention.

FIG. 13 illustrates the structure of pipeline 500 ($LP_{sr}2/2$), which has a number of similarities to pipeline 300 (LP2/2), described above. Each pipeline stage 502a, 502b, 502c has a function block 504a, 504b, 504c and a completion generator 506a, 506b, 506c. As with function block 304a, 304b, 304c, function block 504a, 504b, 504c alternately evaluates and precharges. The completion generator 506a, 506b, 506c produces an output signal 508a, 508b, 508c (Done) to indicate the evaluation or precharge by the function block 504a, 504b, 504c. In turn, output signal 508a, 508b, 508c (Done) is communicated to two stages: (i) to the previous stage, as an "acknowledgement," and (ii) to the next stage, as a "request." In exemplary pipeline 500 ($LP_{sr}2/2$), completion detector 506b communicates the acknowledgement control signal 510a directly to stage 502a (without passing through the stage's matched delay element 540a), and the request control signal 512b (Req) to stage 502c (after passing through matched delay element 540b described below).

A commonly-used scheme, called bundled data is used to implement the asynchronous single-rail datapath. (Bundled-data is described in C. Seitz, "System timing," *Introduction to VLSI Systems,* and Al Davis et al., "Asynchronous circuit design: Motivation, background, and methods," *Asynchronous Digital Circuit Design,* both incorporated by reference above.) In pipeline 500 ($LP_{sr}2/2$), a request control signal 512a, 512b, 512c (Req), indicates arrival of new data at the input 514b, 514c of the next stage 502b, 502c, respectively. More particularly, a high value of the request control signal 512a, 512b (Req) indicates that the previous stage has finished evaluation; a low value of the request control signal 512a, 512b (Req) indicates that the previous stage has completed precharge. For correct operation, a timing constraint must be satisfied, i.e., the request control signal 512a, 512b, 512c (Req) must arrive after the data inputs to the stage are stable and valid. This requirement is met by inserting a "matched delay" element 540a, 540b, which provides a delay that is greater than or equal to the worst-case delay through the function block 504b, 504c, respectively. An advantage of this approach is that the datapath itself can use standard single-rail (synchronous style) blocks.

In practice, there are several ways to implement a matched delay. One technique is to simply use an inverter chain, or a chain of transmission gates; the number of gates and their transistor sizing determines the total delay. A more accurate technique duplicates the worst-case critical path of the logic block, and uses that as a delay line. Bundled data has been widely used in asynchronous design, including a commercial Philips 80C51 asynchronous microcontroller (As described in Hans van Gageldonk et al., "An Asynchronous Low-Power 80C51 Microcontroller," incorporated by reference above).

The protocol of pipeline 500 (LP$_{sr}$2/2) is substantially similar to that of pipeline 10 (PS0), described above. When a stage 502a, 502b, 502c is done evaluating, it tells the previous stage to precharge. Similarly, when a stage is done precharging, it tells the previous stage to evaluate. In addition, the output signal 508a, 508b, 508c (Done) of the completion detector 506a, 506b, 506c is passed forward to the next stage, indicating that the evaluation (or precharge) is complete.

Two optimizations may be used that take advantage of the innate property of dynamic logic. The first is aimed at reducing the cycle time; the second is aimed at decreasing latency.

The first optimization is to "tap off" the output signal 508a, 508b, 508c (Done) for the previous stage from before the matched delay, instead of after the matched delay. Thus, the output signal 508b of completion detector 506b is tapped off before the matched delay element 540b, and passed to stage 502a as acknowledgement signal 510a. This optimization is similar to the "early done" of pipeline 300 (LP2/2). For footed dynamic logic, which is also used in pipeline 500 (LP$_{sr}$2/2), it is safe to indicate completion of precharge as soon as the precharge cycle begins. This advantage is provided because the stage is effectively isolated from changes at its inputs during precharge. Likewise, for a dynamic stage, it is safe to indicate completion of evaluation as soon as the stage begins to evaluate on valid inputs; once the stage has evaluated, its outputs are effectively isolated from a reset at the inputs. (More precisely, completion of evaluation can be safely indicated a time thold after the start of evaluation (see Equation 16). This early tap-off optimization has a significant impact on the pipeline performance. More particularly, the overall cycle time is reduced by an amount equal to two matched delays.

The second optimization is to allow an early precharge-release. In dynamic logic, the function block 504a, 504b, 504c can be precharge-released before new valid inputs arrive. Once data inputs arrive, the function block starts computing its data outputs. Similarly, once the matched bundling input arrives, the bundling output (Req) is also generated. Thus, in our design, precharge release of the function block is completely decoupled from the arrival of valid inputs. In contrast, in several other asynchronous pipeline designs, the function block is precharge-released only after the bundling input has been received (for example, as described in S. B. Furber et al., "Dynamic Logic in Four-Phase Micropipelines, *Proc. Intl. Symp. Adv. Res. Async. Circ. Syst.* (ASYNC), 1996, which is incorporated by reference in its entirety herein.). This later requirement of the previous designs typically adds extra gates to the critical forward path in the pipeline. In contrast, the optimization used in pipeline 500 (LP$_{sr}$2/2) results in a reduction in the forward latency.

A complete cycle of events for a stage 502a, 502b, 502c in pipeline 500 (LP$_{sr}$2/2) is similar to that in pipeline 10 (PS0). From one evaluation of stage 502a to the next evaluation, the cycle consists of four events: (i) stage 502a evaluates, (ii) stage 502b evaluates, (iii) stage 502c starts to evaluate, asserting the precharge input for stage 502b, and finally, (iv) stage 502b starts to precharge, enabling stage 502a to evaluate once again.

The following notation is used for the various delays associated with this pipeline:

'Eval: time for a stage evaluation

'aC: delay of the completion generator (aC element)

'delay: magnitude of the matched delay. For correct operation, 'delay≧'Eval−'aC. For ideal operation, 'delay is no larger than necessary, i.e., 'delay='Eval−'aC. Typically, for gate-level pipelines, the 'aC delay already matches the evaluation delay: 'ac≧'Eval; for such pipelines, the matched delay is unnecessary 'delay=0.

In this notation, the delays of steps (i) and (ii) in the cycle traced above, are each 'Eval. The delays of steps (iii) and (iv) are each 'aC. Therefore, the analytical pipeline cycle time is:

$$T_{LP_{sr}2/2} = 2 \cdot t_{Eval} = 2 \cdot t_{aC} \tag{17}$$

The per-stage forward latency of the pipeline is:

$$L_{LP_{sr}2/2} = {}^tEval \tag{18}$$

Figure 14:
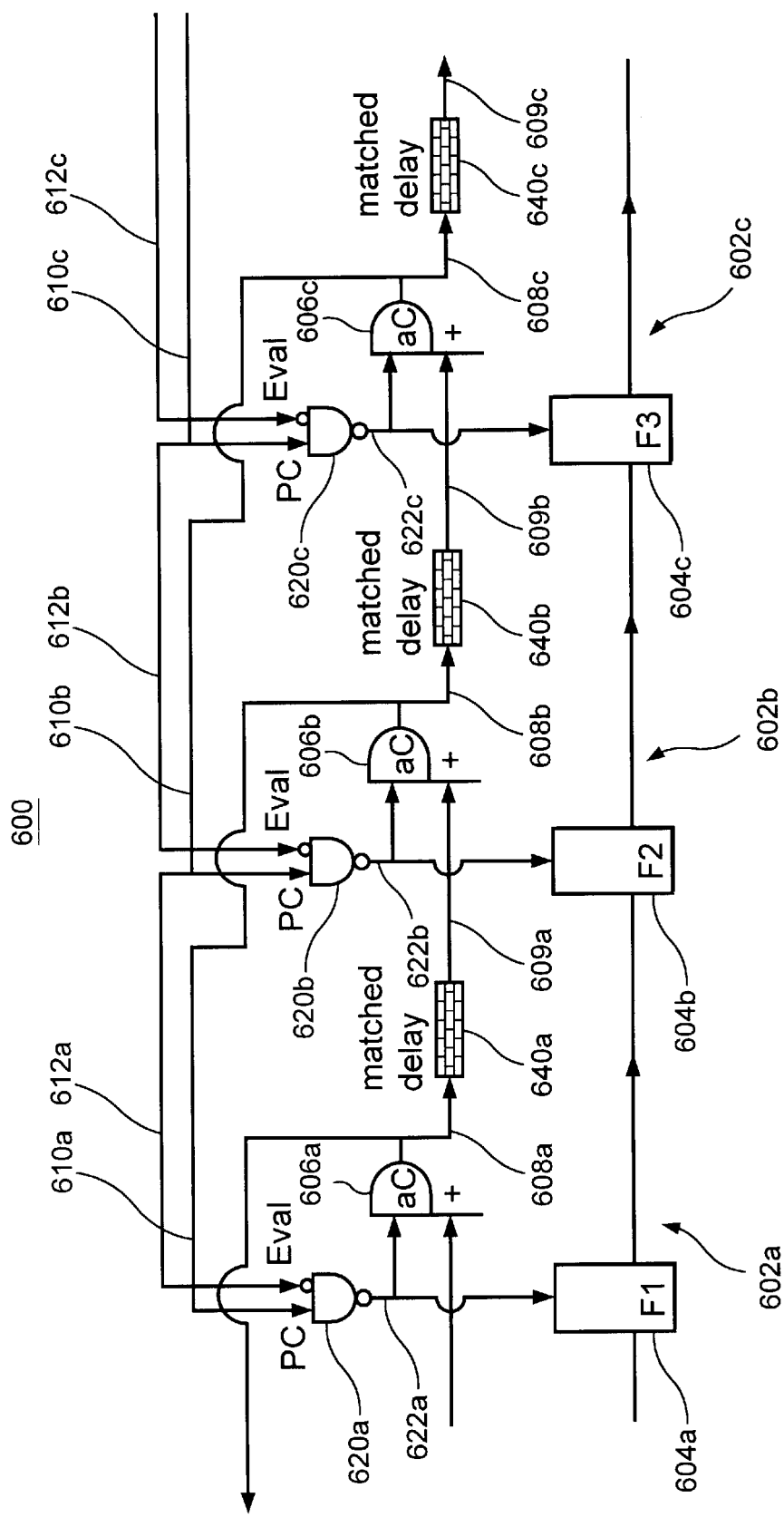
FIG. 14 is a schematic view of a sixth embodiment of a pipeline in accordance with the invention.

FIG. 14 illustrates the structure of pipeline 600 (LP$_{sr}$2/1). Each stage 602a, 602b, 602c has a function block 604a, 604b, 604c and a completion generator 606a, 606b, 606c substantially identical to those of an LP$_{sr}$2/2 single-rail pipeline. However, a stage 602a, 602b, 602c receives control inputs from the subsequent stage, e.g., stage 602a receives the precharge control signal 610a (PC) which is the output signal 608b of the completion generator 606b from stage 602b, as well as from its successor, e.g., stage 602a receives the evaluate control signal 612a (EVAL) which is the output signal 608c of the completion generator 606c from stage 602c. In a substantially identical manner to pipelines 100 and 200 (LP2/1) and pipeline 300 (LP3/1), the evaluate control input 612a, 612b, 612c enables "early evaluation."

The sequencing of control for pipeline 600 (LP$_{sr}$2/1) is substantially identical to that of pipelines 100 and 200 (LP3/1) or pipeline 400 (LP2/1). A complete cycle of events, from one evaluation of stage 602a to the next, consists of three events: (i) stage 602a evaluates, (ii) stage 602b evaluates, and finally, (iii) stage 602c starts to evaluate, triggering "early evaluation" of stage 602a. Thus, the cycle time is:

$$T_{LP_{sr}2/1} = 2 \cdot t_{Eval} + t_{aC} + t_{NAND2} \tag{19}$$

The analytical cycle is somewhat better than that of pipeline 500 LP$_{sr}$2/2), because $t_{NAND2} < t_{aC}$.

Once again, forward latency is simply $t_{EVAL}$:

$$L_{LPsr2/1} = t_{Eval} \tag{20}$$

As with the dual-rail pipelines 100, 200, 300 and 400, above, each of the single-rail pipelines 500 and 600 require certain one-sided timing constraints to be satisfied for correct operation. The HSPICE simulations described below verify that all of these timing constraints are easily satisfied in practice.

Pipeline 600 (LP$_{sr}$2/1), much like pipeline 400 (LP2/1), requires a timing constraint to enforce an adequate precharge width. The precharge of stage N is started by the Done signal of stage N+1, and terminated by the Done signal of stage N+2. In the exemplary embodiment, the precharge of stage 602a is started by the output signal 608b of stage 602b and is terminated by the output signal 608c of stage 602c. The former event occurs a time $t_{aC_{N+1}}$ after stage N has finished its evaluation. The latter events occurs a time $t_{Eval_{N+1}} + t_{aC_{N+2}}$ from the same reference. Therefore, for correct precharge, the precharge width $t_{Prech_N}$ must satisfy:

$$t_{PrechN} \leq t_{EvalN+1} + (t_{aCN+2} - t_{aCN+1}) \quad (21)$$

For correct operation of the evaluation phase, pipeline 600 (LP$_{sr}$2/1) requires a timing constraint on the arrival of the "takeover" signal, much like their dual-rail counterparts. The takeover signal, i.e., the de-assertion of the precharge control signal 610a, 610b, 610c (PC=low), must arrive at the inputs to the NAND gate 620a, 620b, 620c before the de-assertion of the non-persistent evaluate control signal 612a, 612b, 612c (EVAL=low).

The analytical equation for the timing constraint is derived in much the same manner as was done for the dual-rail pipeline, above. The reference time 0 is set at the point when stage N+2 has just asserted its the done signal (Done), which starts the early evaluation of stage N. The time when the evaluate signal (EVAL) for stage N is de-asserted low (from stage N+2) is:

$$t_{delayN+2} + t_{aCN+3} + t_{NAND2N+2} + t_{aCN+2} \quad (22)$$

Similarly, the takeover signal, PC, of stage N is asserted low (from stage N+1) at time:

$$t_{NAND2N+1} + t_{aCN+1} \quad (23)$$

Therefore, to maintain uninterrupted evaluation, the takeover should arrive at least a setup time, $t_{setup}$, before EVAL is de-asserted:

$$t_{NAND2N+1} + t_{aCN+1} + t_{setup} \leq t_{delayN+2} + t_{aCN+3} + t_{NAND2N+2} + t_{aCN+2} \quad (24)$$

Assuming all stages are similar, this constraint simplifies to:

$$t_{Eval} \geq t_{setup} \quad (25)$$

Both pipeline 500 (LP$_{sr}$2/2) and pipeline 600 (LP$_{sr}$2/1) require a constraint to ensure that the data inputs to an evaluating stage are held stable long enough for the stage to complete evaluation. That is, the path through the "early tap-off" must not reset the previous stage before the current stage has effectively absorbed its data inputs. If the time for a precharge-released dynamic gate to absorb its inputs is $t_{hold}$, then the input hold time constraint is:

$$t_{hold} \leq t_{aCN} + t_{PrechN-1} \quad (26)$$

Several issues may arise when lookahead pipelines, as described above, are interfaced with the environment. The first issue concerns providing the environment the capability of resetting, or initializing, the pipelines. The second issue concerns certain environments which can only absorb one control input, or generate one control output, whereas some of the pipeline designs use two control inputs per stage. The third issue concerns robust handling of unusually slow environments that cannot meet certain timing requirements for correct operation.

The first issue, initialization, can be achieved by adding a global "reset" input to every pipeline stage. The reset input forces a precharge of every stage's function logic, and in parallel, it forces the completion signal generators (completion detectors in dual-rail designs, and bundling signal generators in single-rail designs) to go low. This resetting is effected by simply adding an extra pull-up transistor to each logic gate and completion signal generator. Once the pipeline is thus initialized, reset is de-asserted. The pipeline is then ready for operation.

The second issue, two control signals per stage, is implicated by several of the new lookahead pipelines, i.e., pipeline 100 (LP3/1), pipeline 400 (LP2/1) and pipeline 600 (LP$_{sr}$2/1). If the input and output environments can readily handle/generate the two signals, then these pipelines can be directly interfaced with the environments. However, if the environments can only handle one control signal, a novel solution is to use the enhanced pipeline structure of pipeline 200 (LP3/1) (see FIG. 7). The NAND gates 220a, 220b merge the two control inputs within each stage, thereby providing clean single-wire interfaces to both left and right environments. The enhancement of pipeline 200 (LP3/1) can be directly used with the other pipelines which use two controls per stage.

Timing constraints for the pipeline stages are simply exported to the environment. For the left interface, the Done signal from the leftmost stage indicates when the environment can precharge or evaluate. For the right interface, the incoming Done from the environment to the rightmost stage indicates when that stage can precharge or "early-evaluate." In addition, precharge-width and input hold time requirements must also be met by both left and right environments.

The third issue, slow environments, generally has a detrimental impact on most pipeline designs. Normally, the input environment to the pipeline is expected to be reasonably fast. In the event that it is unusually slow, pipeline designs 100, 200, 300, 400 500, and 600, as well as pipelines 10 (PS0) and 20 (PA0), may malfunction. A novel solution described herein is generic and modular when used in connection with any of the above pipelines to robustly handle such slow environments.

The problem arises if the left (or input) environment is "very slow" in precharging. As used herein, an environment which is "very slow" to precharge is defined principally in comparison with the speed in which processing stages are precharge-released, or the duration of time in which the precharge signals are asserted to the environment. (Note that other situations, such as those in which environments are slow in computing, or environments are extremely fast, do not pose any problems. The protocols described above are able to handle those situations.) Consequently, when the leftmost pipeline stage has signaled the environment to precharge, an environment which is "very slow" to precharge has a high likelihood that (i) the leftmost stage may subsequently de-assert the precharge signal to the environment before the environment has completed precharge, and (ii) the leftmost stage may be precharge-released before the stale data inputs from the environment have been re-set. In each case, an environment which is "very slow" to precharge has a high likelihood that an invalid data token may appear in the datapath, causing the pipeline to malfunction.

In order to solve this problem, additional synchronization control is added between the environment and the leftmost pipeline stage. Until the environment has actually completed its precharging, two critical events will thereby be delayed: (1) precharge-release of the environment, i.e., enablement of the environment to evaluate, and (2) precharge-release of the leftmost pipeline stage, i.e., enablement of the leftmost pipeline stage to evaluate. This mechanism ensures that the environment resets properly, and that the leftmost stage does not evaluate prematurely.

Figure 15:
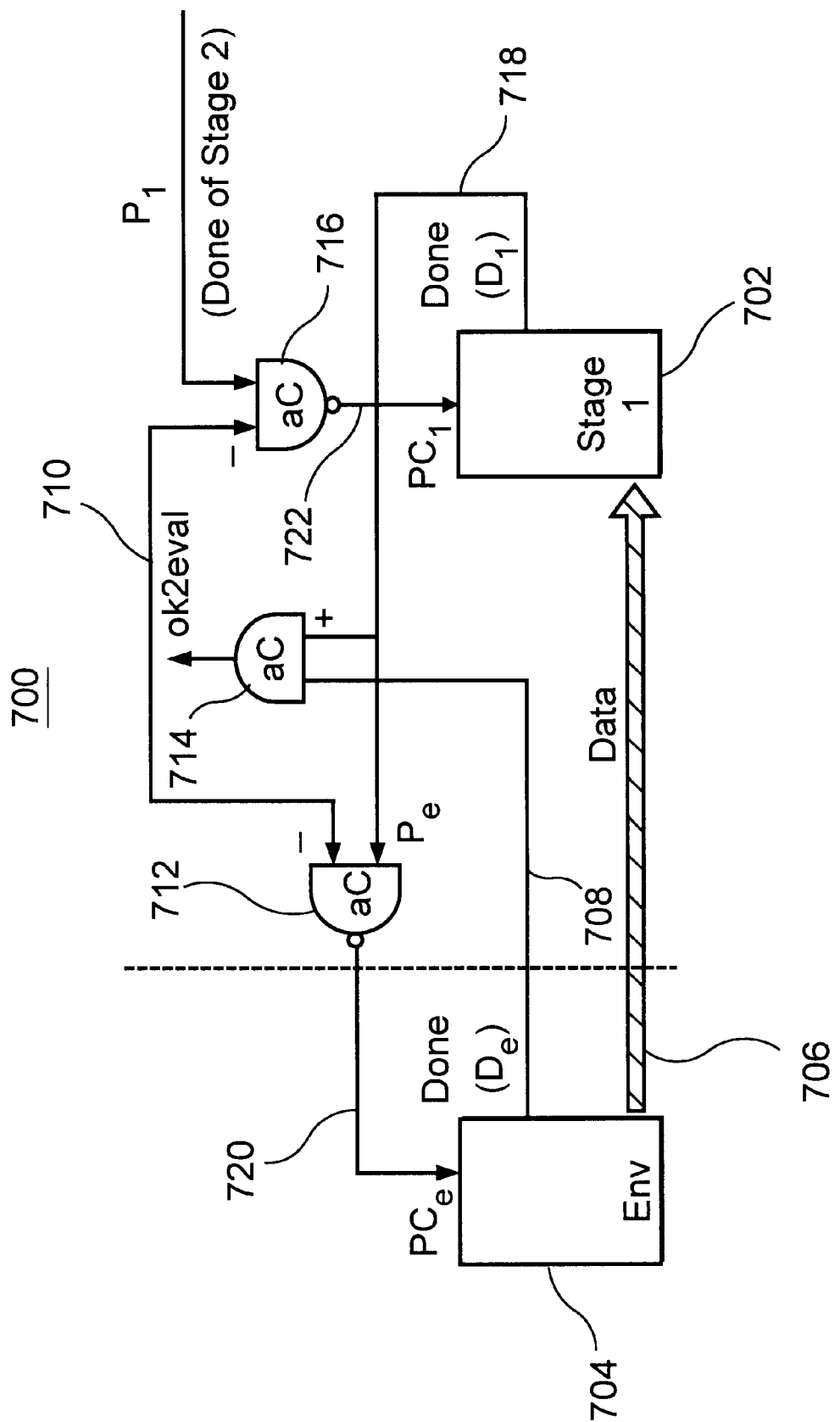
FIG. 15 is a schematic view of another alternative embodiment of pipeline circuitry in accordance with the invention.

An implementation of this solution is synchronization circuit 700, which the controls the environment as well as of the leftmost pipeline stage, as illustrated in FIG. 15. The left-most stage 702 interfaces with the environment 704. The environment 704 provides a environment data output 706 and an environment done signal 708 ($D_e$). For each of the pipelines described herein, the first done signal 718 ($D_1$) is the output of the left-most stage's completion generator. Thus, for dual-rail pipeline 10 (PS0), pipeline 100 (LP3/1), pipeline 300 (LP2/2), and pipeline 400 (LP2/1), the first done signal 718 ($D_1$) is the output 18', 108a, 208a, 308a, 408a of the completion generator 16a, 106a, 206a, 306a, 406a, respectively. For single-rail pipeline 500 ($LP_{sr}2/2$) and 600 ($LP_{sr}2/1$), the first done signal 718 ($D_1$) is the output 508a, 608a of aC elements 506a, 606a, respectively (before the matched delay elements 540a, 640a).

A second done signal 716 ($P_1$) is received from the second stage in the pipeline. For pipeline 10 (PS0), pipeline 300 (LP2/2), and pipeline 500 ($LP_{sr}2/2$), the second done signal 716 ($P_1$) is the output 18a, 308b, 508b from the completion generator 16b, 306b, 506b, respectively. For pipeline 100 (LP3/1), pipeline 400 (LP2/1), and pipeline 600 ($LP_{sr}2/1$), the second done signal 716 ($P_1$) is the merged acknowledgement signals 122a, 422a, 622a, respectively.

Synchronization circuit 700 receives an indication from the environment 704 that the precharge phase is complete by the de-assertion of the environment done signal 708 ($D_e$). A state variable ok2eval 710 is used to keep track of whether the precharge of the environment 704 is complete, i.e., it is responsive to environment done signal 708 ($D_e$), as described below. The novel circuit 700 includes 3 aC elements 712, 714, 716. The state variable ok2eval 710 is the output of aC element 714, which receives two inputs: the environment done signal 708 ($D_e$), and the first done signal 718 ($D_1$). The following production rules (as described in A. J. Martin et al., "The Design of an Asynchronous MIPS R3000 Microprocessor, *Proc. ARVLSI*, September 1997, which is incorporated by reference in its entirety herein) describe the behavior of the circuit:

$$\overline{D_e} \longrightarrow \text{ok2eval}\downarrow \quad (27)$$

$$D_e \wedge D_1 \longrightarrow \text{ok2eval}\uparrow \quad (28)$$

$$p_e \longrightarrow PC_e\downarrow \quad (29)$$

$$p_1 \longrightarrow PC_1\downarrow \quad (30)$$

$$\overline{p_e} \wedge \overline{\text{ok2eval}} \longrightarrow PC_e\uparrow \quad (31)$$

$$\overline{p_1} \wedge \overline{\text{ok2eval}} \longrightarrow PC_1\uparrow \quad (32)$$

As production rule (27), above, states, the state variable ok2eval 710 is de-asserted once the environment has precharged. The state variable ok2eval 710 is asserted once both the environment and the first stage have evaluated (Rule 28). As production rules (31) indicate, the environment 704 is enabled to evaluate when ok2eval 710 is de-asserted and the evaluation of the left-most stage is completed, i.e., the first done signal 718 ($D_1$), is de-asserted. Likewise, production rules (32) indicates that the environment 704 is enabled to evaluate when ok2eval 710 is de-asserted and the evaluation of the second stage is completed, i.e., the second done signal 716 ($P_1$) is de-asserted.

While the pipeline cycle time does increase by one gate delay due to the added circuitry at the interface, in practice this is not a serious overhead because the real bottleneck to high throughput is actually the slow environment. This method of robustly handling slow environments can be modularly applied to many different pipeline schemes.

For wide datapaths, pipeline performance may become limited due to two factors: (i) the overhead of distributing the control signals to the entire width of the datapath, and, in the case of dual-rail pipelines, (ii) the overhead of completion detection along the entire width of the datapath. Solutions to this problem that significantly reduce these overheads are described herein, which allow high-speed operation.

First, simple FIFO datapaths (i.e., without logic processing) are considered and their pipelining is discussed. Next, these ideas are generalized to datapaths with logic processing.

A simple and effective technique to handle wide FIFO's without logic processing is to use partitioning: the datapath is divided into several narrower datapaths, each only a few bits wide. For example, a 32-bit wide FIFO can be partitioned into eight 4-bit wide datapaths. The narrower datapaths are regarded as separate, mutually independent FIFO's, each with its own control circuitry. As a result, each of the control signals (PC/EVAL) is now fanned-out to fewer gates, thereby keeping the overhead of control distribution low. In addition, for the special case of dual-rail pipelines, the cost of completion detection is significantly lowered, since each completion detector is for a narrower FIFO, and thus it examines fewer bits. Thus, using partitioning, a wide FIFO can deliver the same high throughput as the narrower FIFO's. (In this approach, though, the environment must have the capability to adequately handle the multiple FIFO's.) Partitioning is an effective approach for scaling gate-level pipelines to wide datapaths, without any significant performance degradation.

When processing logic is added to the pipeline, more complicated issues of data dependence must be considered. Dual-rail datapaths are considered first, and single-rail next.

Figure 16:
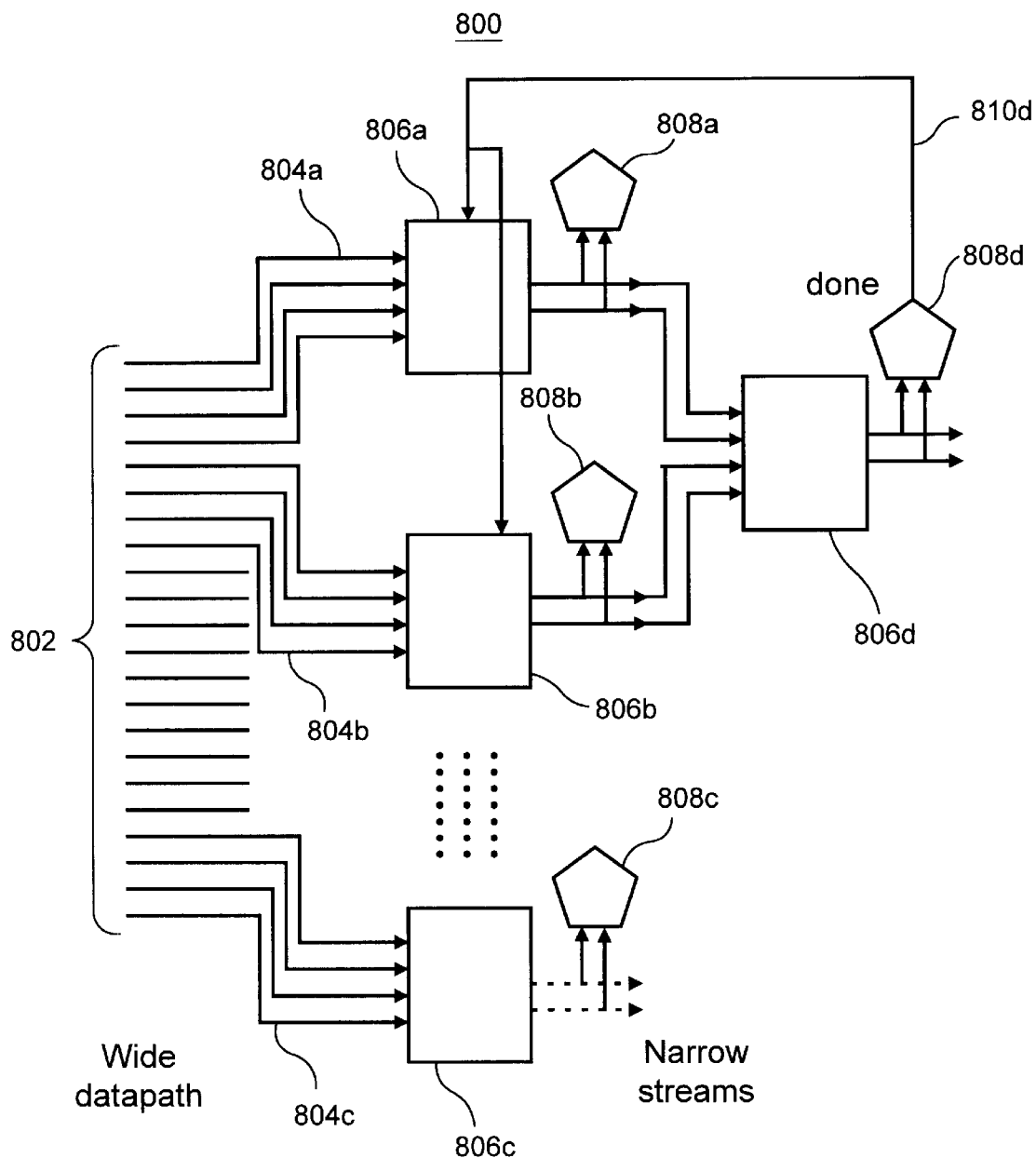
FIG. 16 is a schematic view of another embodiment of the invention.

FIG. 16 illustrates an exemplary embodiment of a circuit 800 for handling a wide dual-rail datapath 802, which may be partitioned into several data streams 804a, 804b, 804c having respective stages 806a, 806b, 806c. As in wide FIFO's, each completion detector 808a, 808b, 808c only examines the bits belonging to its own data stream. As a result, completion detection is low cost, since it is partitioned among narrow data streams. Similarly, the output of a stage's completion detector is fanned-out to only those sources whose outputs belong to the fan-in of that stage. Since this fan-out is typically small, the distribution of the control signals is also low cost.

Figure 17:
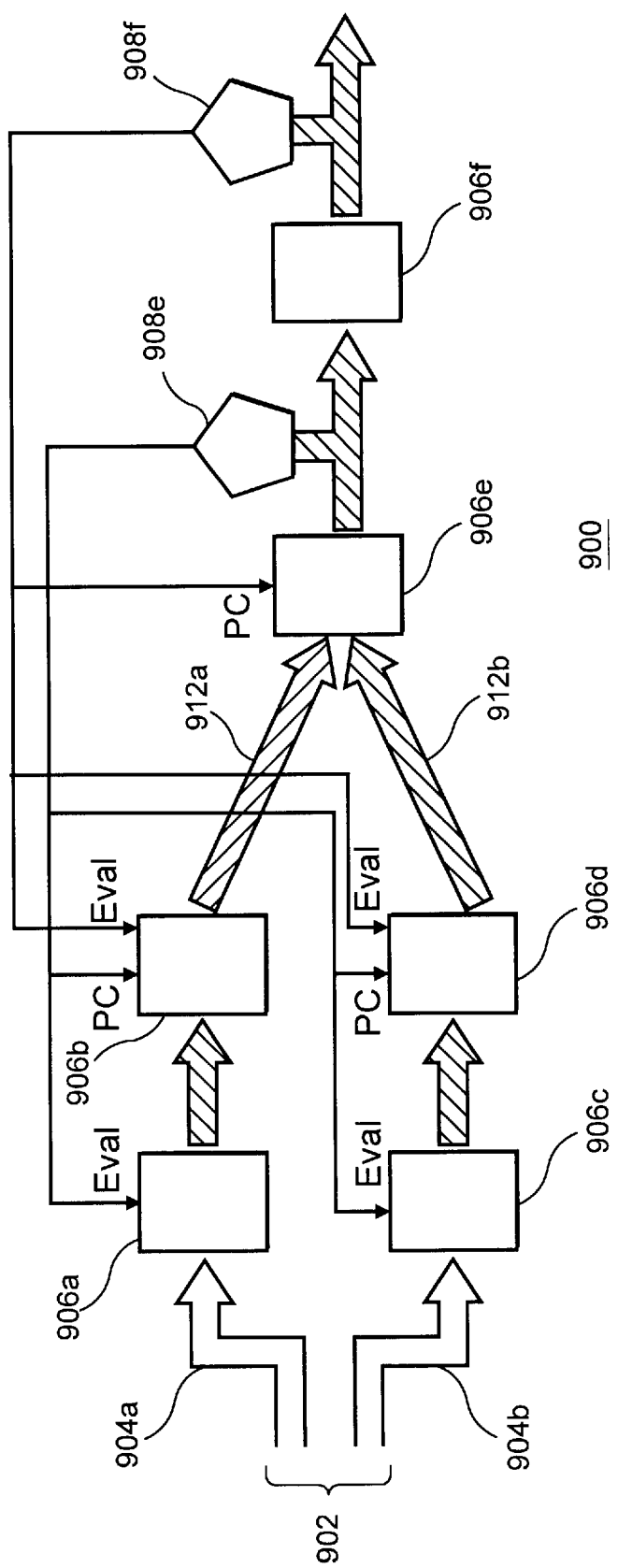
FIG. 17 is a schematic view of yet another embodiment of the invention.

In contrast to FIFO's where separate data streams don't interact, datapaths with logic processing may involve merging and forking of data streams at certain points in the pipeline, which complicates the pipeline structures. Merging of data streams is easily handled in the pipelines 100, 200, 300, 400, 500, 600 described above. More particularly, when multiple streams merge at a pipeline stage, e.g., stage 806d, the stage's acknowledge signal 810d from completion detector 808d is simply forked off backwards to each stream. As illustrated in FIG. 17, circuit 900 handles a wide dual-rail datapath 902, which is partitioned into data streams 904a and 904b. and is substantially identical to circuit 800 (see FIG. 16), except as described herein. Circuit 900 includes consecutive processing stages 906a/906b and 906c/906d, which are responsive to acknowledgement signals from two subsequent stages, and which are similar to the processing stages of pipeline 100 (LP3/1). (The completion detectors for these stages have been omitted for clarity.) As with circuit 800, the merged datapaths 912a and 912b are merged by simply supplying both datapaths to the next pipeline stage 906e ("merge" stage), which in turn supplies data to stage 906f. The acknowledgement signal from the completion detector 908e of stage 906e is forked off backwards to each of the multiple input streams, i.e., as an evaluate control signal (EVAL) to stages 906a, 906c and as a precharge control signal (PC) to stages 906b, 906d. Similarly, the completion detector 908f of stage 906f is forked off backwards as an evaluate control signal (EVAL) to stages 906b, 906d and as a precharge control signal (PC) to stages 906e. It is noted that this procedure and configuration for merging data streams as described with respect to FIGS. 16 and 17 is applicable to pipeline 300 (LP2/2) and pipeline 400 (LP2/1); however, it is understood that the respective completion generators for pipelines 300 and 400 are positioned in front of their respective function block, as illustrated in FIGS. 9 and 12(a), above.

Figure 18:
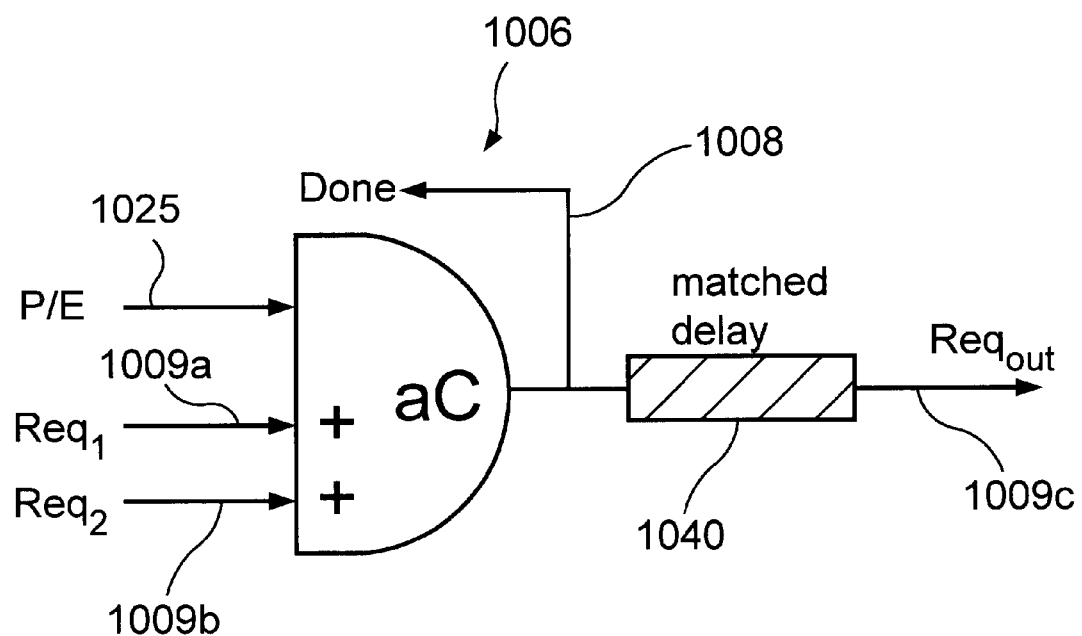
FIG. 18 is a schematic view of a further embodiment of the invention.
Figure 19:
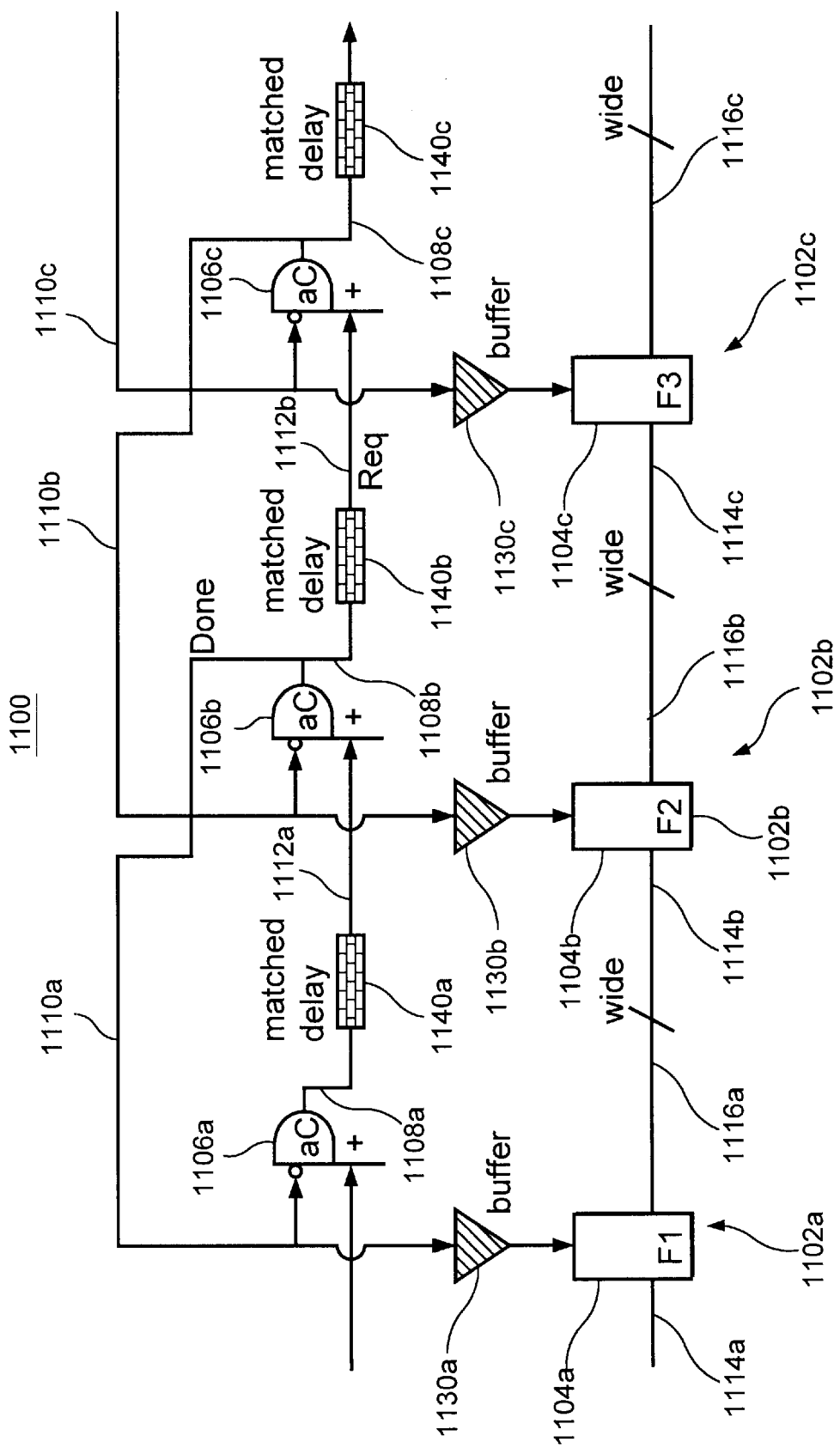
FIG. 19 is a schematic view of a still further embodiment of the invention.

Gate-level pipelining of wide single-rail datapaths may be performed according to exemplary embodiments illustrated in FIGS. 18 and 19. A first exemplary embodiment for merging datapaths is illustrated in FIG. 18. This embodiment uses partitioning, as with the dual-rail circuits 800 and 900, above. In contrast to the merged dual-rail pipelines, the single-rail pipelines are configured to handle multiple request signals, i.e., one for each data stream. Therefore, the merging of the data streams requires the explicit combining of multiple request signals at the stage's inputs. This merger is achieved by completion generator 1006 is illustrated in FIG. 18, which substitutes for completion generators 506a, 506b, 506c of pipeline 500 and for completion generators 606a, 606b, 606c of pipeline 600. Preferably is an aC element having an "unmarked" P/E input 1025 and a "+" input for each request control signal 1009a ($Req_1$), 1009b ($Req_2$). (Although two request control signals are illustrated in FIG. 18, indicative of two merged data streams, it is noted that more than two data streams may be merged according to this configuration and procedure. As is known in the art, each additional request signal is accommodated by adding one transistor to the pull-down stack of the aC element of the completion generator 1006.) The P/E input 1025 corresponds to the precharge control input 510a, 510b, 510c (PC) for pipeline 500, and corresponds to the output 622a, 622b, 622c of the NAND2 gate 620a, 620b, 620c for pipeline 600. The request control signal 1009b ($Req_1$), 1009b ($Req_2$) correspond to the request control signals 512a, 512b of pipeline 500 and request control signals 609a, 609b of pipeline 600. The resulting done signal 1008 is forked off to multiple destinations: as an acknowledgement signal to the multiple input streams and as request control signal 1009c ($Req_{out}$) after passing through the matched delay element 1040.

A further exemplary embodiment of this pipeline 1100 is illustrated in FIG. 17, which shows how the scheme is implemented for the pipeline 500 ($LP_{sr}2/2$), described above. No partitioning is used. Instead, throughput overheads are reduced by earlier generation of the control signals along the critical path. The control signal for the completion generator can be produced earlier than the control signal that precharges and evaluates the stage. Pipeline 1100 is substantially identical to pipeline 500, with the differences noted herein. When a wide datapath 1114a/1116a, 1114b/1116b, 1114c/1116c is used, the control signals 1110a, 1110b, 1110c, must be passed through additional buffers 1130a, 1103b, 1130c to provide the necessary amplification to drive the load of the entire datapath. According to the exemplary embodiment, the buffers are a pair of inverters. However, the control signals 1108a, 1108b, 1108c for the completion generators 1140a, 1104b, 1140c do not need this amplification, since they are simply tapped off from before the buffers 1130a, 1130b, 1130c. This "early generation" scheme is another type of anticipation. More particularly, by sensing the control signal 1108a, 1108b, 1108c from before the buffer 1130a, 1130b, 1130c, the completion generator 1140a, 1140b, 1140c is given a head-start on its next action, the generator of the done signal 1110a, 1110b, 1110c (Done).

The net impact of this "early generation" scheme is that the buffering overhead for broadcasting the control signals is removed from the critical path. In particular, while the precharge and evaluation of the datapath is delayed due to the buffers, the completion signal 1112a, 1112b, 1112c (Req) itself is generated without the buffer delay. As a result, the overall cycle time of the pipeline 1100 is free of the delays of the added buffers 1130a, 1130b, 1130c. The timing constraints for the pipeline also is unaffected, assuming all buffer delays to be equal.

This method of taking the buffer delay off of the critical path is called control kiting and related approaches have been successfully used in other work (as described in C. Molnar et al., "Two FIFO Ring Performance Experiments," *Proceedings of the IEEE*, 87(2):297–307, February 1999, and K. Y. Yun et al., "High-Performance Asynchronous Pipeline Circuits," *Proc. Intl. Symp. Adv. Res. Async. Circ. Syst.* (ASYNC), 1996, both of which are incorporated by reference in their entirety herein.).

As described above, there are several strategies for efficient gate-level pipelining of wide datapaths, both single-rail as well as dual-rail. As a result, the overhead of control distribution across the entire width of the datapath can be fairly low. In addition, for dual-rail pipelines, the cost of the completion detector can be kept manageable.

EXAMPLE

This section presents the results of simulations of lookahead pipelines. All of the five lookahead styles are considered: the three dual-rail pipelines 100 (LP3/1), pipeline 300 (LP2/2) and pipeline 400 (LP2/1) and the two single-rail pipelines 500 ($LP_{sr}2/2$) and pipeline 600 ($LP_{sr}2/1$). Results of simulations of Williams'pipeline 10 (PS0) are also presented, to serve as the base case for comparison.

For each of the lookahead styles, as well as for PS0, basic FIFO's (4-bit and 16-bit) without logic processing was first designed and simulated. Then, for the highest performance style, $LP_{sr}2/1$, a pipelined ripple-carry adder was designed and simulated.

The simulations were carried out using HSPICE for 0.61 µm HP CMOS process. The operating conditions were 3.3V power supply and 300° K.

The transistor sizing was fine-tuned as known in the art to optimize throughput. A detailed analysis of capacitative loading at each node of the control circuits in all the pipeline designed was performed, to determine the optimal transistor sizes. To ensure consistency, identical datapaths were used in all the designs, with the following transistor sizes for the dynamic function blocks: the W/L of the precharge PMOS transistor is 24λ/2λ and the W/L of the two series NMOS transistors is 18λ/2λ. (For example, function block 104a illustrated in FIG. 6 may include PMOS transistor 125a and NMOS transistors 127a and 129a, i.e., the n-stack.)

Tables I and II summarize the results of the simulation for the dual-rail pipelines. Table I gives results of simulation for 4-bit FIFO's, and Table II gives results for 16-bit FIFO's. For each of the three dual-rail styles—LP3/1, LP2/2 and LP2/1—as well as for Williams' PS0, the tables list the overall pipeline cycle time T, and a breakdown of the cycle time into the following components:

| | |
|---|---|
| $t_{Eval}$: | time for a stage evaluation |
| $t_{Prech}$: | time for a stage precharge |
| $t_{CD}$: | delay through the completion detector (average of the up and down transitions). This includes the delay through the buffers that amplify this signal to provide sufficient drive. |
| $t_{NAND2}$: | For LP3/1 and LP2/1, this is the delay through the NAND2 gate that combines the two control inputs into one (see FIG. 6). |

The second approach was to implement the 16-bit datapath without partitioning, using full 16-bit completion detection. Simulation results for the unpartitioned FIFO's are given in Table II. Pipeline 400 (LP2/1) once again delivers the highest throughput of all four designs: 640 million data items per second, which is 83% faster than pipeline 10 (PS0). Pipeline 100 (LP3/1) and pipeline 300 (LP2/2) exhibited improvements of 38% and 64%, respectively, over pipeline 10 (PS0). As expected, the throughput in each case is somewhat less than that of the partitioned FIFO's, because full 16-bit completion detectors are somewhat slower than 4-bit ones.

TABLE I

THE PERFORMANCE OF DUAL-RAIL LP PIPELINES VS. WILLIAMS' PS0:
RESULTS FOR (I) 4-BIT FIFO's, AND (II) 16-BIT FIFO's PARTITIONED INTO FOUR 4-BIT FIFO'S.

| Pipeline Design | $t$Eval (ns) | $t$Prech (ns) | $t$CD (ns) | $t$NAND2 (ns) | Cycle time, T Analytical Formula | (ns) | Throughput $10^6$ items per sec. | % increase over PS0 |
|---|---|---|---|---|---|---|---|---|
| LP3/1 | 0.24 | 0.26 | 0.72 | 0.26 | 3 · $t$Eval + $t$CD + $t$NAND2 | 1.70 | 590 | 40% |
| LP2/2 | 0.22 | 0.26 | 0.45 | — | 2 · $t$Eval + 2 · $t$CD | 1.33 | 760 | 79% |
| LP2/1 | 0.22 | 0.25 | 0.38 | 0.36 | 2 · $t$Eval + $t$CD + $t$NAND2 | 1.18 | 860 | 102% |
| PS0 | 0.25 | 0.25 | 0.68 | — | 3 · $t$Eval + 2 · $t$CD + $t$Prech | 2.38 | 420 | Base |

TABLE II

THE PERFORMANCE OF DUAL-RAIL LP PIPELINES VS. WILLIAMS' PS0:
16 BIT FIFO IMPLEMENTATIONS.

| Pipeline Design | $t$Eval (ns) | $t$Prech (ns) | $t$CD (ns) | $t$NAND2 (ns) | Cycle time, T Analytical Formula | (ns) | Throughput $10^6$ items per sec. | % increase over PS0 |
|---|---|---|---|---|---|---|---|---|
| LP3/1 | 0.27 | 0.25 | 0.91 | 0.35 | 3 · $t$Eval + $t$CD + $t$NAND2 | 2.06 | 485 | 38% |
| LP2/2 | 0.25 | 0.25 | 0.62 | — | 2 · $t$Eval + 2 · $t$CD | 1.74 | 575 | 64% |
| LP2/1 | 0.27 | 0.25 | 0.64 | 0.38 | 2 · $t$Eval + $t$NAND2 | 1.56 | 640 | 83% |
| PS0 | 0.25 | 0.24 | 0.93 | — | 3 · $t$Eval + 2 · $t$CD + $t$Prech | 2.85 | 350 | Base |

Finally, the tables list the throughput of each pipeline in million data items per second, as well as express it as a percentage improvement over the throughput of pipeline 10 (PS0).

The throughput of each of our 4-bit FIFO's is significantly higher than that of PS0 (see Table I). As expected, pipeline 400 (LP2/1) delivers the highest throughput of all four designs, 860 million data items per second: this rate is 102% faster than that of Williams' pipeline 10 (PS0) (420 million data items per second). Our other two designs, pipeline 100 (LP3/1) and pipeline 300 (LP2/2), also exhibited higher throughputs: 590 and 760 million data items per second, respectively, which represent 40% and 79% improvements. That is in agreement with the discussion above. The throughputs increase in the following order: pipeline 10 (PS0), pipeline 100 (LP3/1), pipeline 300 (LP2/2) and pipeline 400 (LP2/1.)

The 16-bit FIFO's were implemented using two different approaches. The first approach was to partition the wide datapath into four distinct datapaths, each only 4 bits wide, as described above. Simulation results for these partitioned 16-bit FIFO's were identical to the results for the 4-bit FIFO's given in Table I.

The throughput improvements obtained in the lookahead pipelines are principally due to two factors: (i) protocol optimizations, and (ii) faster completion detectors. With each new protocol optimization, since there are fewer component delays, overall cycle time is reduced. The reductions in the number of critical components are summarized in the Analytical Formula column of Table I. The second factor is a circuit-level issue dealing with an individual component: the completion detector. Column $t_{CD}$ indicates that in two of the pipeline designs—pipeline 300 (LP2/2) and pipeline 400 (LP2/1)—the completion detector delay is significantly lower. The reason is that these two designs use an aC element with a very short pull-up stack (see FIGS. 10–11). In contrast, the completion detectors of pipeline 10 (PS0) and pipeline 100 and 200 (LP3/1) use a symmetric C element which is typically slower.

As the results show, the latencies of the processing stages ($t_{Eval}$ and $t_{Prech}$) are essentially the same as in Williams' pipeline 10 (PS0). Hence, the throughput improvements are obtained without degrading latency.

Finally, the simulations also indicate that the timing constraints described above were met with adequate margins. With reference to Equation 10a, above, the precharge width timing constraint was met, which takes into account delays of $t_{NAND2\downarrow}$ of about 0.06 ns, $t_{bubble\downarrow}$ of about 0.21 ns, and $t_{NAND2\uparrow}$ of about 0.14 ns. There was at least a 0.24 ns safety margin for precharge pulse-width (almost 100% margin), at least a 0.40 ns safety margin for safe takeover, and at least a 0.55 ns safety margin for input hold time.

The operation of the 4-bit FIFO was simulated for both of the single-rail bundled-datapath designs—pipeline 500 ($LP_{sr}2/2$) and pipeline 600 ($LP_{sr}2/1$). Table III summarizes the results of the simulation. For each of the pipelines, the overall pipeline cycle time T is shown, as well as the delays of individual components: stage evaluation time ($t_{Eval}$), stage precharge time ($t_{Prech}$), the delay though the completion generator ($t_{aC}$), and in the case of pipeline 600 ($LP_{sr}2/1$), the delay through the extra NAND gate ($t_{NAND2}$).

TABLE III

THE PERFORMANCE OF SINGLE RAIL $LP_{sr}2/2$ AND $LP_{sr}2/1$: 16-BIT FIFO IMPLEMENTATIONS.

| Pipeline Design | $t$Eval (ns) | $t$Prech (ns) | $t$aC (ns) | $t$NAND2 (ns) | Cycle Time, T Analytical Formula | (ns) | Throughput $10^6$ items per sec. |
|---|---|---|---|---|---|---|---|
| $LP_{sr}2/2$ | 0.19 | 0.21 | 0.29 | — | 2 · $t$Eval + 2 $t$aC | 0.95 | 1050 |
| $LP_{sr}2/1$ | 0.19 | 0.21 | 0.26 | 0.19 | 2 · $t$Eval + $t$aC + $t$NAND2 | 0.83 | 1208 |

The two new designs, pipeline 500 ($LP_{sr}2/2$) and pipeline 600 ($LP_{sr}2/1$), deliver very high throughputs: 1050 million and 1208 million data items per second, respectively. As expected, the throughput of pipeline 600 ($LP_{sr}2/1$), which combines both early evaluation and early done protocols, is better than the throughput of pipeline 500 ($LP_{sr}2/2$).

The results of Table II are for 4-bit as well as 16-bit FIFO's, and nearly identical results were obtained for both the scheme of FIG. 17 (handling wide datapaths) was used to hide and/or eliminate the overhead of control distribution to the entire datapath. Consequently, 16-bit FIFO's substantially as fast as 4-bit FIFO's.

As with the dual-rail designs, the simulations again indicate that the timing constraints described above were adequately met, with similar safety margins.

It will be understood that the foregoing is only illustrative of the principles of the invention, and that various modifications can be made by those skilled in the art without departing from the scope and spirit of the invention.

What is claimed is:

1. A latchless dynamic asynchronous digital pipeline circuit for processing data in an environment comprising:
   a first processing stage comprising:
     a first function block enabled to enter a first precharge phase and a first evaluate phase in response to a first precharge control signal, and having a first data input for receiving the data for processing from the environment and a first data output for receiving the data processed by the first function block upon completion of the first evaluate phase;
     a first completion generator responsive to the first precharge control signal and a first request signal from the environment and which asserts a first environment precharge control signal;
     a first delay element which applies a delay to the environment precharge control signal to produce a second request signal;
   a second processing stage comprising:
     a second function block enabled to enter a second precharge phase and a second evaluate phase in response to a second precharge control signal, and having a second data input for receiving the data for processing from the first data output and a second data output for receiving the data processed by the second function block upon completion of the second evaluate phase;
     a second completion generator responsive to the second precharge control signal and the second request signal and which asserts the first precharge control signal;
     a second delay element which applies a delay to the first precharge control signal to produce a third request signal.

2. The latchless dynamic asynchronous digital pipeline circuit recited in claim 1, wherein the data is provided with a single-rail scheme.

3. The latchless dynamic asynchronous digital pipeline circuit recited in claim 1, wherein the first and second completion generators are asymmetric C-elements.

4. The latchless dynamic asynchronous digital pipeline circuit recited in claim 1, further comprising a third processing stage comprising:
   a third function block enabled to enter a third precharge phase and a third evaluate phase in response to a third precharge control signal, and having a third data input for receiving the data for processing from the second data output and a third data output for receiving the data processed by the third function block upon completion of the third evaluate phase;
   a third completion generator responsive to the third precharge control signal and the third request signal and which asserts the second precharge control signal;
   a third delay element which applies a delay to the second precharge control signal to produce a fourth request signal,
   wherein the second data input is configured to receive data from the first data output and the second completion generator is responsive to the second precharge control signal, the second request and the fourth request signal and which asserts the first precharge control signal.

5. The latchless dynamic asynchronous digital pipeline circuit recited in claim 1, wherein the environment is enable to enter a precharge phase and an evaluate phase, further comprising:
   a synchronization circuit configured to receive an indication of the completion of the precharge phase of the environment and to delay enablement of the evaluate phase of the environment and to delay enablement of the first evaluate phase of the first function block until receipt of the indication of the completion of the precharge phase of the environment.

6. A latchless dynamic asynchronous digital pipeline circuit for processing data comprising:
   a first processing stage comprising:

a NAND gate configured to combine a first output signal from a subsequent processing stage and a second output signal from a next subsequent processing stage; and a first function block which is configured to enter an evaluate phase in response to the first output signal and the second output signal.

7. The latchless dynamic asynchronous digital pipeline circuit of claim 6, wherein one of the first output signal and the second output signal is inverted before combination at the NAND gate.

8. The latchless dynamic asynchronous digital pipeline circuit of claim 6, wherein the first function block is configured to enter a precharge phase in response to the first output signal and the second output signal.

9. A latchless dynamic asynchronous digital pipeline circuit for processing data comprising:

a first processing stage configured to receive data for processing, and comprising:

a first function block, and a completion detector, having a first input for receiving an indication of data from a previous processing stage and a second input for receiving an indication of completion of an evaluate phase of a subsequent processing stage, wherein the completion detector is configured to send an output signal to the previous processing stage indicative of completion of an evaluate phase or a precharge phase of the first function block in parallel with the evaluate phase or the precharge phase of the first function block.

10. The latchless dynamic asynchronous digital pipeline circuit of claim 9, wherein the completion detector asserts the output signal when the completion detection has received an indication of data and said first function block is enabled to being the evaluate phase, and said completion detector de-asserts said output signal when said first function block is enabled to begin the precharge phase.

11. A latchless dynamic asynchronous digital pipeline circuit for processing data comprising:

a first processing stage configured to receive data for processing comprising:

a NAND gate configured to combine an indication of completion of an evaluate phase of a subsequent processing stage and for receiving an indication of completion of an evaluate phase of a next subsequent processing stage, and to produce a first output signal;

a first function block which is configured to enter an evaluate phase in response to the first output signal; and a completion detector, having a first input for receiving an indication of data from a previous processing stage and a second input for receiving the first output signal from the NAND gate, wherein the completion detector is configured to send an output signal to the previous processing stage indicative of completion of an evaluate phase or a precharge phase of the first function block in parallel with the evaluate phase or the precharge phase of the first function block.

* * * * *

UNITED STATES PATENT AND TRADEMARK OFFICE
CERTIFICATE OF CORRECTION

PATENT NO.     : 6,590,424 B2
DATED          : July 8, 2003
INVENTOR(S)    : Singh et al.

It is certified that error appears in the above-identified patent and that said Letters Patent is hereby corrected as shown below:

Drawings,
Figure 2, "Invetor buffer" should read -- Inverter buffer --

Signed and Sealed this

Eighteenth Day of January, 2005

JON W. DUDAS
*Director of the United States Patent and Trademark Office*

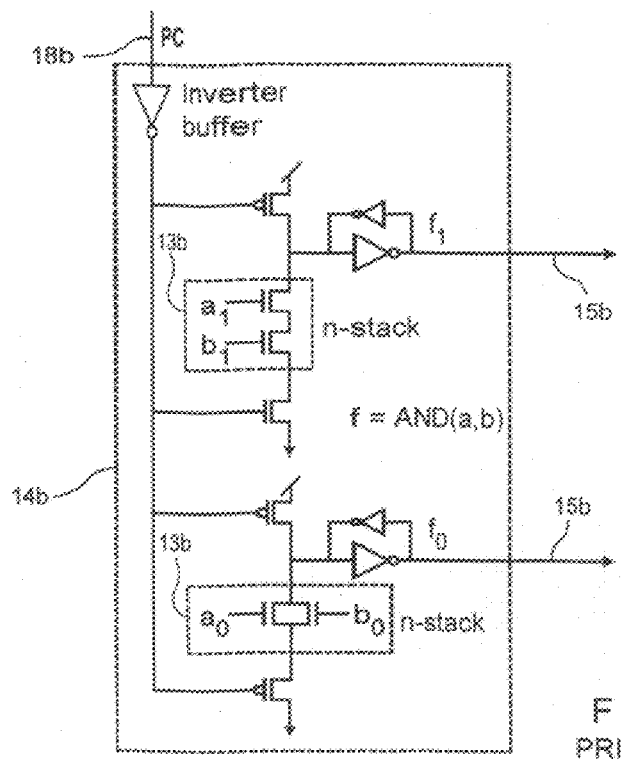
FIG. 2
PRIOR ART
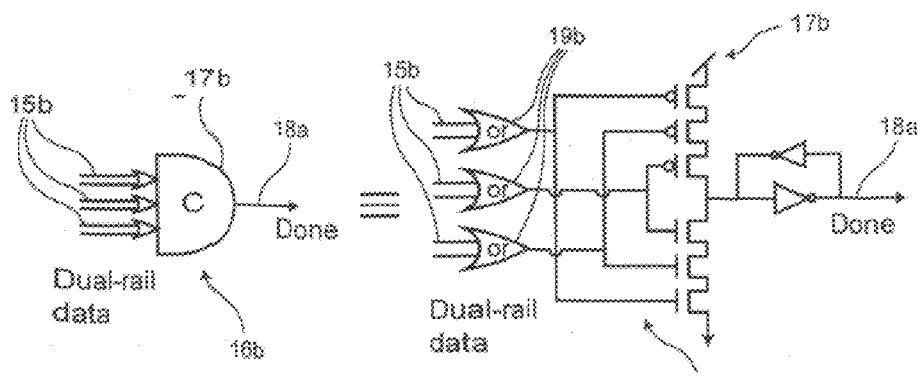
FIG. 3A
PRIOR ART
FIG. 3B
PRIOR ART